(12) United States Patent
Xia et al.

(10) Patent No.: US 7,368,523 B2
(45) Date of Patent: May 6, 2008

(54) POLYESTER POLYMER AND COPOLYMER COMPOSITIONS CONTAINING TITANIUM NITRIDE PARTICLES

(75) Inventors: Zhiyong Xia, Kingsport, TN (US); Steven Lee Stafford, Gray, TN (US); Susan Sims, Kingsport, TN (US); Frederick Leslie Colhoun, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/228,672

(22) Filed: Sep. 16, 2005

(65) Prior Publication Data

US 2006/0106146 A1    May 18, 2006

Related U.S. Application Data

(63) Continuation-in-part of application No. 11/094,034, filed on Mar. 30, 2005, now abandoned, which is a continuation-in-part of application No. 10/988,133, filed on Nov. 12, 2004, now abandoned.

(51) Int. Cl.
  *C08K 3/22*    (2006.01)
(52) U.S. Cl. ............... 528/279; 528/503; 428/34.7; 428/35.9; 524/783; 524/413
(58) Field of Classification Search ........... 528/279, 528/503; 524/783, 413; 428/34.7, 35.9
See application file for complete search history.

(56) References Cited

U.S. PATENT DOCUMENTS

| | | |
|---|---|---|
| 3,264,255 A | 8/1966 | Taylor |
| 3,420,913 A | 1/1969 | Railsback |
| 3,660,328 A | 5/1972 | Lindquist, Jr. |
| 3,733,309 A | 5/1973 | Wyeth et al. |
| 3,795,601 A | 3/1974 | Brewer et al. |
| 4,087,482 A | 5/1978 | Shaffer |
| 4,097,445 A | 6/1978 | Martins et al. |
| 4,159,301 A | 6/1979 | Buser et al. |
| 4,185,043 A | 1/1980 | Shaffer |
| 4,228,549 A | 10/1980 | Rispoli |
| 4,230,595 A | 10/1980 | Yamaji et al. |
| 4,250,078 A | 2/1981 | McFarlane et al. |
| 4,321,298 A | 3/1982 | Shaffer et al. |
| 4,343,922 A | 8/1982 | Shaffer |
| 4,408,004 A | 10/1983 | Pengilly |
| 4,420,581 A | 12/1983 | McFarlane et al. |
| 4,476,272 A | 10/1984 | Pengilly |
| 4,481,314 A | 11/1984 | Rule |
| 4,520,078 A | 5/1985 | Rabinowitz et al. |
| 4,535,118 A | 8/1985 | Pengilly |
| 4,604,303 A | 8/1986 | Takakura et al. |
| 4,617,374 A | 10/1986 | Pruett et al. |
| 4,702,963 A | 10/1987 | Phillips et al. |
| 4,702,980 A | 10/1987 | Matsuura et al. |
| 4,740,377 A | 4/1988 | Dawes et al. |
| 5,147,722 A | 9/1992 | Koslow |
| 5,189,077 A | 2/1993 | Kerby |
| 5,220,140 A | 6/1993 | Ball et al. |
| 5,300,746 A | 4/1994 | Walters et al. |
| 5,310,977 A | 5/1994 | Stenkamp et al. |
| 5,340,884 A | 8/1994 | Mills et al. |
| 5,367,070 A | 11/1994 | Nath et al. |
| 5,382,157 A | 1/1995 | Denis et al. |
| 5,409,983 A | 4/1995 | Jones et al. |
| 5,419,936 A | 5/1995 | Tindale |
| 5,514,462 A | 5/1996 | Endo et al. |
| 5,529,744 A | 6/1996 | Tindale |
| 5,593,740 A | 1/1997 | Strumban et al. |
| 5,656,221 A | 8/1997 | Schumann et al. |
| 5,656,716 A | 8/1997 | Schmidt et al. |
| 5,774,571 A | 6/1998 | Marshall |
| 5,830,544 A | 11/1998 | Kerscher et al. |
| 5,851,668 A | 12/1998 | Sandor et al. |
| 5,906,882 A | 5/1999 | Valente et al. |
| 5,925,710 A | 7/1999 | Wu et al. |
| 5,940,022 A | 8/1999 | Takatsu |
| 5,976,450 A | 11/1999 | Mreijen |

(Continued)

FOREIGN PATENT DOCUMENTS

CN    1312218    9/2001

(Continued)

OTHER PUBLICATIONS

Notification of Transmittal of the International Search Report and the Written Opinion of the International Searching Authority, or the Declaration date of mailing Apr. 7, 2006.

(Continued)

*Primary Examiner*—Irina S Zemel
(74) *Attorney, Agent, or Firm*—Michael K. Carrier; Bernard J. Graves, Jr.

(57) ABSTRACT

Polyester compositions are disclosed that include polyester polymers or copolymers having incorporated therein titanium nitride particles that provide one or more of the following advantages: improving the reheat properties of the compositions, improving the color of the compositions through reduced yellowness, and improving the UV-blocking properties of the compositions. Processes for making such compositions are also disclosed. The titanium nitride particles may be incorporated in the polyester by melt compounding, or may be added at any stage of the polymerization, such as during the melt-phase of the polymerization. A range of particle sizes may be used, as well as a range of particle size distributions. The polyester compositions are suitable for use in packaging made from processes in which a reheat step is desirable, or decreased yellowness is desired, or increased resistance to the effects of ultraviolet light is desired, or any combination of the foregoing.

21 Claims, 5 Drawing Sheets

U.S. PATENT DOCUMENTS

| | | | |
|---|---|---|---|
| 5,998,004 A | 12/1999 | Nishino et al. |
| 6,022,920 A | 2/2000 | Maxwell et al. |
| 6,031,128 A | 2/2000 | Roh et al. |
| 6,165,601 A | 12/2000 | Noda et al. |
| 6,197,851 B1 | 3/2001 | Maxwell et al. |
| 6,200,659 B1 | 3/2001 | Fujimori et al. |
| 6,261,656 B1 | 7/2001 | Semersky |
| 6,274,852 B1 | 8/2001 | Blok et al. |
| 6,300,399 B1 | 10/2001 | Gallucci et al. |
| 6,323,271 B1 | 11/2001 | Caldwell et al. |
| 6,358,578 B1 | 3/2002 | Otto et al. |
| 6,427,826 B1 | 8/2002 | Li et al. |
| 6,428,882 B1 | 8/2002 | Peiffer et al. |
| 6,440,383 B1 | 8/2002 | Duyvesteyn et al. |
| 6,465,098 B2 | 10/2002 | Mizuguchi et al. |
| 6,472,471 B2 | 10/2002 | Cooke et al. |
| 6,473,024 B2 | 10/2002 | Toyoda et al. |
| 6,500,890 B2 | 12/2002 | Edwards et al. |
| 6,503,586 B1 | 1/2003 | Wu et al. |
| 6,572,810 B2 | 6/2003 | Chatterjee et al. |
| 6,590,069 B2 | 7/2003 | Nichols et al. |
| 6,660,792 B2 | 12/2003 | Massey et al. |
| 6,710,158 B2 | 3/2004 | Edwards et al. |
| 6,716,904 B2 | 4/2004 | Takahashi |
| 6,727,306 B2 | 4/2004 | Edwards et al. |
| 6,773,800 B2 | 8/2004 | Hosoe et al. |
| 6,777,048 B2 | 8/2004 | Quillen |
| 6,780,916 B2 | 8/2004 | Tung et al. |
| 6,797,401 B2 | 9/2004 | Herron |
| 6,827,897 B2 | 12/2004 | Hall et al. |
| 6,896,830 B2 | 5/2005 | Carlton et al. |
| 6,916,354 B2 | 7/2005 | Elliott |
| 2002/0011694 A1 | 1/2002 | Nichols et al. |
| 2002/0033560 A1 | 3/2002 | Nichols et al. |
| 2002/0137872 A1 | 9/2002 | Schneider et al. |
| 2003/0017336 A1 | 1/2003 | Gedanken et al. |
| 2003/0018115 A1 | 1/2003 | Massey et al. |
| 2003/0040564 A1 | 2/2003 | Tung et al. |
| 2003/0108702 A1 | 6/2003 | Tung et al. |
| 2004/0030029 A1 | 2/2004 | Weinhold et al. |
| 2004/0101642 A1 | 5/2004 | Quillen et al. |
| 2004/0122150 A1 | 6/2004 | Quillen et al. |
| 2004/0178386 A1 | 9/2004 | Tung et al. |
| 2004/0180159 A1 | 9/2004 | Neal et al. |
| 2004/0185198 A1 | 9/2004 | Sisson et al. |
| 2004/0249113 A1 | 12/2004 | Quillen et al. |
| 2005/0170115 A1 | 8/2005 | Tibbitt et al. |
| 2007/0203279 A1 | 8/2007 | Jarvis et al. |

FOREIGN PATENT DOCUMENTS

| | | |
|---|---|---|
| DE | 32 48 840 A1 | 9/1983 |
| EP | 0 429 311 A2 | 5/1991 |
| EP | 0581246 | 2/1994 |
| EP | 0465040 B1 | 1/1997 |
| EP | 0884365 A2 | 12/1998 |
| EP | 0921144 A1 | 6/1999 |
| EP | 1152035 A1 | 11/2001 |
| EP | 1535944 A1 | 6/2005 |
| FR | 2 675 654 | 4/1991 |
| GB | 1 242 636 | 8/1971 |
| GB | 1 285 904 | 8/1972 |
| GB | 2 112.827 A | 7/1983 |
| JP | 52-039790 A | 3/1977 |
| JP | 56159248 | 12/1981 |
| JP | 59-015427 A | 1/1984 |
| JP | 60-151826 | 8/1985 |
| JP | 60-151826 A | 8/1985 |
| JP | 60151826 * | 8/1985 |
| JP | 60264313 | 12/1985 |
| JP | 61-278558 | 12/1986 |
| JP | 61-278558 A | 12/1986 |
| JP | 61-291650 | 12/1986 |
| JP | 61278558 * | 12/1986 |
| JP | 62-039208 | 2/1987 |
| JP | 62-177035 | 8/1987 |
| JP | 62-177035 A | 8/1987 |
| JP | 62177035 * | 8/1987 |
| JP | 63 237207 | 10/1988 |
| JP | 63 237207 A | 10/1988 |
| JP | 63-315604 | 12/1988 |
| JP | 02194030 | 7/1990 |
| JP | 2-214734 A | 8/1990 |
| JP | 22-14734 | 8/1990 |
| JP | 2214734 * | 8/1990 |
| JP | 06-184333 A | 7/1994 |
| JP | 06 215618 | 8/1994 |
| JP | 06 215618 A | 8/1994 |
| JP | 6-279599 A | 10/1994 |
| JP | 62-79599 | 10/1994 |
| JP | 6279599 * | 10/1994 |
| JP | 07058490 | 3/1995 |
| JP | 07292087 | 11/1995 |
| JP | 09-256220 A | 9/1997 |
| JP | 1999 071106 A | 3/1999 |
| JP | 11-181067 A | 7/1999 |
| JP | 1999 236440 A | 8/1999 |
| JP | 11-349868 | 12/1999 |
| JP | 2000 302854 A | 10/2000 |
| JP | 2001048972 | 2/2001 |
| JP | 2001226474 | 8/2001 |
| JP | 2001 262016 | 9/2001 |
| JP | 2003306601 | 10/2003 |
| WO | WO96/03163 | 2/1996 |
| WO | WO96/03163 A1 | 2/1996 |
| WO | WO 96/03163 A1 | 2/1996 |
| WO | WO99/57173 A1 | 11/1999 |
| WO | WO 01/21680 A1 | 3/2001 |
| WO | WO 01/46306 A1 | 6/2001 |
| WO | WO 01/47688 A2 | 7/2001 |
| WO | WO 02/031840 A1 | 4/2002 |
| WO | WO 03/010225 A1 | 2/2003 |
| WO | WO 03/010226 A1 | 2/2003 |
| WO | WO 2004/013015 A1 | 2/2004 |
| WO | WO 2004/031258 | 4/2004 |
| WO | WO 2004/083294 A1 | 9/2004 |
| WO | WO 2005/068531 A1 | 7/2005 |
| WO | WO 2005/095516 A1 | 10/2005 |
| WO | WO 2005/011058 A2 | 11/2005 |

OTHER PUBLICATIONS

Notification of Transmittal of the International Search Report and the Written Opinion of the International Searching Authority, or the Declaration date of mailing Feb. 1, 2006 for International Appl. No. PCT/US2005/030657.

Notification of Transmittal of the International Search Report and the Written Opinion of the International Searching Authority, or the Declaration date of mailing Feb. 16, 2006 for International Appl. No. PCT/US2005/030551.

Notification of Transmittal of the International Search Report and the Written Opinion of the International Searching Authority, or the Declaration date of mailing Mar. 14, 2006 for International Appl. No. PCT/US2005/042471.

Notification of Transmittal of the International Search Report and the Written Opinion of the International Searching Authority, or the Declaration date of mailing Feb. 28, 2006 for International Appl. No. PCT/US2005/038730.

Weissmann, Mariana, et al.; "Theoretical study of carbon-coated iron nanowires"; Physical Review B 70, 201401-1 through 201401-4; 2004; The American Physical Society.

Zhang, Z. D. et al.; "Shell/core structure and magnetic properties of carbon-coated Fe-Co © nanocapsules"; Journal of Physics: Condensed Matter 13; 1921-1929; 2001; Institute of Physics Publishing Ltd.
Encyclopedia of Chemical Technology; 4th Edition; vol. 4; pp. 1015-1037; John Wiley and Sons, New York.
Pigment Handbook; 1973; pp. 323-349-; vol. 1; John Wiley and Sons; New York.
Research Disclosure, 39771, May 1997, 343.
Billmeyer Jr., Fred W.; Principles of Color Technology; pp. 25-66; John Wiley and Sons; New York; 1981.
A. Boehm and A. Glaser, "The quaterrylimides-highly efficeint NIR absorbers for plastics," ANTEC paper 2004, Chicago, IL, May 2004.
Pierson, H. O.; Handbook of Carbon, Graphite, Diamond and Fullerenes: Properties and Applications; pp. 122-140; Noyes Publications; 1993.
Toth, Louis E.; Transition Metal Carbides and Nitrides; p. 87; 1971; Academic Press; London.
Wu, S. "A Generalized Criterion for Rubber Toughening: The Critical Matrix Ligament Thickness," Journal of Applied Polymer Science, vol. 35, 549-561, 1988, John Wiley & Sons, Inc.
Co-pending U.S. Appl. No. 10/988,226, filed Nov. 12, 2004.
Co-pending U.S. Appl. No. 10/988,133, filed Nov. 12, 2004.
Co-pending U.S. Appl. No. 10/988,263, filed Nov. 12, 2004.
Co-pending U.S. Appl. No. 10/996,944, filed Nov. 24, 2004.
Co-pending U.S. Appl. No. 10/997,040, filed Nov. 24, 2004.
Co-pending U.S. Appl. No. 11/005,689, filed Dec. 7, 2004.
Notification of Transmittal of the International Search Report and the Written Opinion of the International Searching Authority, or the Declaration date of mailing May 17, 2006 on the PCT filing of the co-pending U.S. Appl. No. 11/054,194 date of filing Feb. 9, 2005.
Notification of Transmittal of the International Search Report and the Written Opinion of the International Searching Authority, or the Declaration date of mailing Apr. 7, 2006 on the PCT filing of the co-pending U.S. Appl. No. 10/988,263 date of filing Nov. 12, 2004.
Office Communication dated Nov. 8, 2006 from the co-pending U.S. Appl. No. 11/005,689 date of filing Dec. 7, 2004.
Notification of Transmittal of the International Search Report and the Written Opinion of the International Searching Authority, or the Declaration date of mailing Nov. 17, 2006 on the PCT filing of the co-pending U.S. Appl. No. 11/228,773 date of filing Sep. 16, 2005.
Copending U.S. Appl. No. 10/996,924, filed Nov. 24, 2004.
Copending U.S. Appl. No. 11/372,819, filed Mar. 10, 2006.
Copending U.S. Appl. No. 11/229,238, filed Sep. 16, 2005.
Copending U.S. Appl. No. 11/495,431, filed Jul. 28, 2006.
Copending U.S. Appl. No. 11/524,056, filed Sep. 6, 2006.
Office Action dated Dec. 7, 2005, in copending U.S. Appl. No. 11/005,689.
Office Action dated Jun. 8, 2006, in copending U.S. Appl. No. 11/005,689.
Office Action dated Nov. 8, 2006, in copending U.S. Appl. No. 10/988,226.
Office Action dated May 11, 2006, in copending U.S. Appl. No. 10/988,226.
Office Action dated Nov. 29, 2005, in copending U.S. Appl. No. 10/988,226.
Notification of Transmittal of the International Search Report and the Written Opinion of the International Searching Authority, or the Declaration date of mailing Feb. 15, 2007 for International Application No. PCT/US2005/030834.
Notification of Transmittal of the International Search Report and the Written Opinion of the International Searching Authority, or the Declaration date of mailing Jun. 26, 2006 for International Application No. PCT/US2006/009692.
Notification of Transmittal of the International Search Report and the Written Opinion of the International Searching Authority, or the Declaration date of mailing Feb. 13, 2007 for International Application No. PCT/US2006/034412.
Encyclopedia of Chemical Technology; 4th Edition; vol. 24; pp. 225-349; John Wiley and Sons, New York (1997).
Chen et al.; "Preparation of nanosized titania powder via the controlled hydrolysis of titanium alkoxide", Journal of Materials Science 31; pp. 3497-3500; 1996.
Gao et al.; "Synthesis of Nanocrystalline Titanium Nitride Powders by Direct Nitridation of Titanium Oxide"; Journal American Ceramic Society, vol. 84; No. 12; pp. 2045-3047; 2001.
Peelamedu et al.; "TiN from Ti02 via Cycling Microwave"; American Ceramic Society Bulletin; vol. 81; No. 8; pp. 57-60; Aug. 2002.
Encyclopedia of Pol. Sci., vol. 11, p. 96-99, Wiley and Sons, 2002.
Office Action date of mailing Jun. 21, 2007 received in co-pending U.S. Appl. No. 11/372,819.
Office Action date of mailing May 29, 2007 received in co-pending U.S. Appl. No. 11/005,689.
Notice of Allowance in copending US Appl. No. 10/988,226 dated Aug. 1, 2007.

* cited by examiner

POLYESTER POLYMER AND COPOLYMER COMPOSITIONS CONTAINING TITANIUM NITRIDE PARTICLES

CROSS-REFERENCE TO RELATED APPLICATIONS

This application is a continuation-in-part of U.S. patent application Ser. No. 11/094,034 filed on Mar. 30, 2005 now abandoned, which in turn is a continuation-in-part of U.S. patent application Ser. No. 10/988,133 filed on Nov. 12, 2004 now abandoned, the disclosures of each of which are incorporated herein by reference in their entirety.

FIELD OF THE INVENTION

The invention relates to polyester compositions that are useful in packaging, such as in the manufacture of beverage containers by reheat blow molding, or other hot forming processes in which polyester is reheated. The compositions of the invention may exhibit improved reheat and improved ability to block ultraviolet light, while exhibiting a pleasing visual appearance, through good clarity and color, with reduced yellowness.

BACKGROUND OF THE INVENTION

Many plastic packages, such as those made from poly(ethylene terephthalate) (PET) and used in beverage containers, are formed by reheat blow-molding, or other operations that require heat softening of the polymer.

In reheat blow-molding, bottle preforms, which are test-tube shaped injection moldings, are heated above the glass transition temperature of the polymer, and then positioned in a bottle mold to receive pressurized air through their open end. This technology is well known in the art, as shown, for example in U.S. Pat. No. 3,733,309, incorporated herein by reference. In a typical blow-molding operation, radiation energy from quartz infrared heaters is generally used to reheat the preforms.

In the preparation of packaging containers using operations that require heat softening of the polymer, the reheat time, or the time required for the preform to reach the proper temperature for stretch blow molding (also called the heat-up time), affects both the productivity and the energy required. As processing equipment has improved, it has become possible to produce more units per unit time. Thus it is desirable to provide polyester compositions which provide improved reheat properties, by reheating faster (increased reheat rate), or with less reheat energy (increased reheat efficiency), or both, compared to conventional polyester compositions.

The aforementioned reheat properties vary with the absorption characteristics of the polymer itself. Heat lamps used for reheating polymer preforms are typically infrared heaters, such as quartz infrared lamps, having a broad light emission spectrum, with wavelengths ranging from about 500 nm to greater than 1,500 nm. However, polyesters, especially PET, absorb electromagnetic radiation poorly in the region from 500 nm to 1,500 nm. Thus, in order to maximize energy absorption from the lamps and increase the preform's reheat rate, materials that will increase infrared energy absorption are sometimes added to PET. Unfortunately, these materials tend to have a negative effect on the visual appearance of PET containers, for example increasing the haze level and/or causing the article to have a dark appearance. Further, since compounds with absorbance in the visible light wavelength range (400 nm to 780 nm) appear colored to the human eye, materials that absorb and/or scatter visible light will impart color to the polymer.

A variety of black and gray body absorbing compounds have been used as reheat agents to improve the reheat characteristics of polyester preforms under reheat lamps. These conventional reheat additives include carbon black, graphite, antimony metal, black iron oxide, red iron oxide, inert iron compounds, spinel pigments, and infrared-absorbing dyes. The amount of absorbing compound that can be added to a polymer is limited by its impact on the visual properties of the polymer, such as brightness, which may be expressed as an L* value, and color, which is measured and expressed as an a* value, a b* value, and haze, as further described below.

To retain an acceptable level of brightness and color in the preform and resulting blown articles, the quantity of reheat additive may be decreased, which in turn decreases reheat rates. Thus, the type and amount of reheat additive added to a polyester resin may be adjusted to strike the desired balance between increasing the reheat rate and retaining acceptable brightness and color levels.

Due to aesthetic reasons, a blue tinge is normally desired in polyester beverage containers, especially containers for water applications. Polymer articles with a blue tinge tend to be more appealing to the human eye, and are thus generally preferred in these applications. Basic color theory indicates that yellow and blue are complementary colors. It follows that the removal of one of these colors from the visible white light will lead to an article appearing to be the other color. For example, when yellow light is removed from the visible light, the article will appear to be blue-dominated. Yellowness, which may be measured as b* values in the CIE color system, may thus be a particularly undesirable color in consumer packaging, and bluing agents such as cobalt and organic toners have been used to increase the blue tint of consumer packaging, thus shifting the b* value from yellow to blue (or from higher to lower b* values), creating a more appealing package. It would be ideal to simultaneously increase the reheat rate and decrease the rate at which color and brightness degrade, such as by increased yellowness, as the concentration of the reheat additive in a thermoplastic composition is increased. Because appearance is important in such packaging, and because bottles having a bluish tint have been very successful in the marketplace, and especially in the marketing of bottled water, it would be an additional advantage to provide a reheat additive that imparts a bluish tinge to the polymers in which it is used, thus acting as a bluing agent.

A further disadvantage of some conventional reheat additives known in the art is their instability during the PET manufacturing process. For example, antimony metal is known to re-oxidize to antimony oxide (which is ineffective at increasing reheat rate) if there are oxygen leaks in the melt-phase or solid-stating manufacturing processes. This results in variability in the heat-up rates of preforms in the reheat blow molding process and thus requires constant adjustments of the infrared lamp settings. It would clearly be an advantage to provide a reheat additive that may be relatively resistant to these re-oxidation effects.

While polyesters used for packaging, such as PET and its copolymers, have been adapted for use as containers for a wide range of consumer products, their inability to block ultraviolet (UV) light of certain wavelengths has made them less well-suited for use in the packaging of products subject to photo-degradation, such as fruit juices, soft drinks, wines, food products, cosmetics, shampoos, and products containing UV-sensitive dyes. Ultraviolet light is not visible to the naked eye, having a wavelength from about 100 nm to about 400 nm, and is subdivided into UV-C having a wavelength from about 100 nm to about 280 nm, UV-B having a wavelength from about 280 nm to about 315 nm, and UV-A having a wavelength from about 315 nm to about 400 nm. Although polyesters such as PET block much of the ultraviolet light from about 100 nm up to about 315 nm, they are less effective at blocking UV-A light from about 315 nm to about 400 nm. U.S. Pat. No. 4,617,374, related to the use of polymerizable UV-blocking agents (the disclosure of which is incorporated herein by reference in its entirety), describes some of the known effects of ultraviolet light on packaged products, and offers the ability to block a portion of the ultraviolet light to which the container is exposed by the use of such blocking agents. Clearly, an additive which may provide a polyester composition having improved reheat, or improved bluing, or improved UV-blocking, or any combination of these advantages, would make the resulting polyester article suitable in the packaging of a wide range of consumer products.

There remains a need in the art for polyester compositions containing additives providing one or more of: improved reheat without the problems associated with known reheat additives, such as re-oxidation and inconsistent reheat; improved brightness, clarity, and color, through reduced yellowness; and improved resistance of the contents to the effects of UV light.

SUMMARY OF THE INVENTION

The invention relates to polyester compositions that comprise polyester polymers or copolymers, and especially thermoplastic polyester polymers or copolymers, having incorporated therein titanium nitride particles that provide one or more of: improved reheat, reduced yellowness, and increased resistance of the contents to the effects of ultraviolet light. The titanium nitride particles may be incorporated in the polyester by melt compounding, or may be added at any stage of the polymerization, such as during the melt-phase of the polymerization. A range of particle sizes may be used, as well as a range of particle size distributions. The polyester compositions may comprise a single type of polyester polymer, or may be blends of polyesters having one or more other polymers blended therein, and especially one or more polyamides or other polymers that provide advantages not possible with the use of a single polymer, such as improved oxygen-scavenging effect, or improved acetaldehyde scavenging effect, or the like.

The polyester compositions according to the invention are suitable for use in packaging, such as those in which a reheat step may be desirable, and are provided with titanium nitride particles in an amount sufficient to improve the reheat efficiency, or reduce the yellowness, or increase the resistance of the contents to the effects of ultraviolet light, or any combination of the foregoing benefits. These compositions may be provided as a melt, in solid form, as preforms such as for blow molding, as sheets suitable for thermoforming, as concentrates, and as bottles, the compositions comprising a polyester polymer, with titanium nitride particles dispersed in the polyester. Suitable polyesters include polyalkylene terephthalates and polyalkylene naphthalates.

The invention relates also to processes for the manufacture of polyester compositions in which titanium nitride particles may be added to any stage of a polyester polymerization process, such as during the melt phase for the manufacture of polyester polymers. The titanium nitride particles may also be added to the polyester polymer which is in the form of solid-stated pellets, or to an injection molding machine for the manufacture of preforms from the polyester polymers.

DETAILED DESCRIPTION OF THE INVENTION

Figure 1:
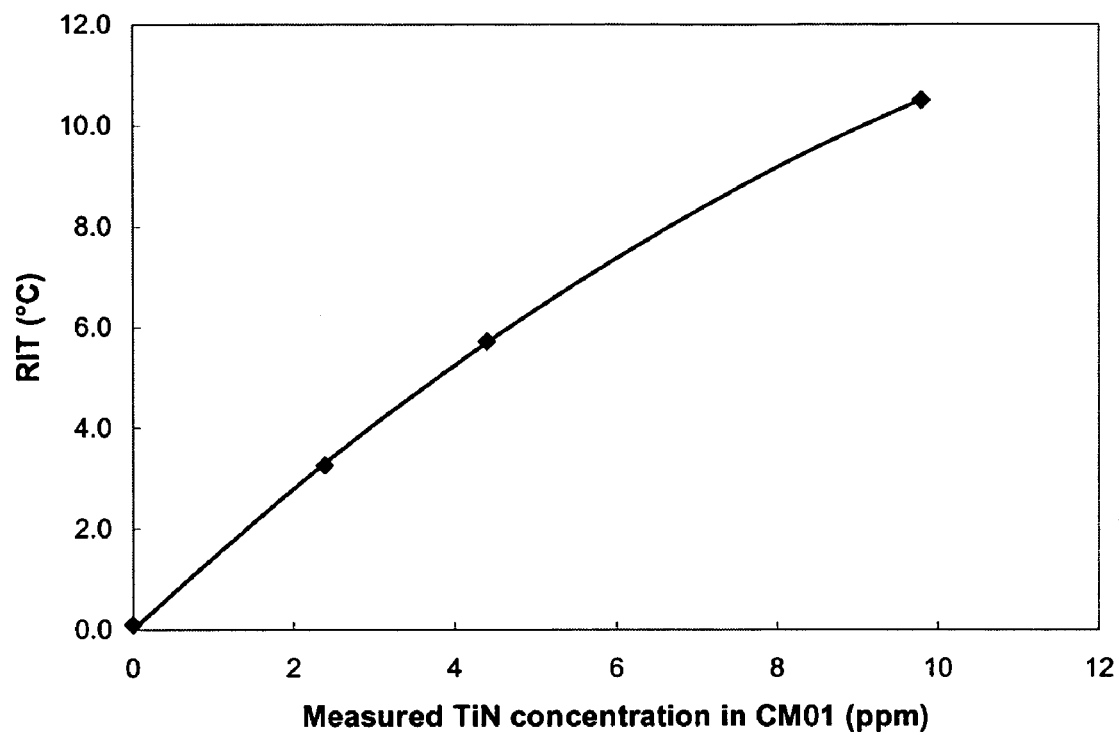
FIG. 1 depicts the correlation between the concentration of 20 nm titanium nitride particles and the twenty-ounce bottle preform reheat improvement temperatures (RIT) of bottles containing the particles.

The present invention may be understood more readily by reference to the following detailed description of the invention, including the appended figures, and to the examples provided. It is to be understood that this invention is not limited to the specific processes and conditions described, because specific processes and process conditions for processing plastic articles may vary. It is also to be understood that the terminology used is for the purpose of describing particular embodiments only and is not intended to be limiting. It is further understood that although the various embodiments may achieve one or more advantages, the claimed invention is not restricted to those advantages, nor need all the advantages be obtained in every instance.

As used in the specification and the claims, the singular forms "a," "an," and "the" include plural referents unless the context clearly dictates otherwise. For example, reference to processing a thermoplastic "preform," "container" or "bottle" is intended to include the processing of a plurality of thermoplastic preforms, articles, containers, or bottles.

By "comprising" or "containing" we mean that at least the named compound, element, particle, etc. must be present in the composition or article, but does not exclude the presence of other compounds, materials, particles, etc., even if the other such compounds, material, particles, etc. have the same function as what is named.

As used herein, a "$d_{50}$ particle size" is the median diameter, where 50% of the volume is composed of particles larger than the stated $d_{50}$ value, and 50% of the volume is composed of particles smaller than the stated $d_{50}$ value. As used herein, the median particle size is the same as the $d_{50}$ particle size.

According to the invention, titanium nitride particles may be used to obtain one or more of the following advantages: to improve the reheat properties of the polyester compositions in which they are distributed; as a bluing agent to increase the blue tint of the polyester compositions in which they are distributed; or to improve the UV-blocking properties of the polyester compositions in which they are distributed. Of course, the polyester compositions of the invention may have additional advantages beyond those just given, and the invention is intended to encompass such additional advantages as well.

When we say that the polyester compositions of the invention may have improved reheat properties, we mean that the compositions may reheat faster (increased reheat rate), or with less reheat energy (increased reheat efficiency), or both, compared to conventional polyester compositions that do not include the titanium nitride particles of the invention, when exposed, for example, to similar infrared heating, or radiation. A convenient measure is the reheat improvement temperature (RIT) of the compositions, as further defined herein.

When we say that the polyester compositions of the invention may have reduced yellowness, or that the titanium nitride particles may act as a bluing agent, we mean that the resulting compositions may appear to be less yellow, or more blue, or both, or that the b* value, as measured using the tristimulus CIE L*a*b* scale, as further described herein, is lower than it would be in the absence of the titanium nitride particles of the invention. For example, the b* value may be lowered by at least 1 unit, or at least 2 units, or at least 3 units.

When we say that the polyester compositions of the invention may have UV-blocking effect, we mean that the compositions may provide increased resistance of the contents to the effects of ultraviolet light. This phenomenon can be determined by visual inspection of contents such as dyes that degrade over time in the presence of UV light. Alternatively, the UV-blocking effect of the polyester compositions of the invention can be measured by UV-VIS measurements, such as by using a HP8453 Ultraviolet-Visible Diode Array Spectrometer, performed from a wavelength ranging from 200 nm to 460 nm. An effective comparison measure using this equipment would be a reduction in the percent of UV transmission rate at 370 nm, the polyester compositions of the invention typically obtaining a reduction of at least 5%, or at least 10%, or at least 20% when compared with polyester compositions without the titanium nitride particles of the invention. For example, if the unmodified polymer exhibits a transmission rate of about 80%, and the modified polymer exhibits a transmission rate of about 60%, the reduction would be a reduction of 25%. Any other suitable measure of the ability of the polyester compositions to block a portion of the UV light incident upon the compositions may likewise be used. A suitable sample thickness, for purposes of approximating the thickness of a bottle side-wall, might be, for example, about 0.012 inches thick, or from about 0.008 to about 0.020 inches thick.

While the polyester compositions of the invention in the broadest sense may provide any or all of the foregoing advantages within a wide range of polymer types and amounts, and titanium nitride particle concentration, particle size, purity, and various other properties described herein, in some cases particular ranges of materials and types may be especially suited to particular uses, and these embodiments will be further described in the appropriate portions of the specification.

Titanium nitride is commonly considered to be a compound of titanium and nitrogen in which there is approximately a one-to-one correspondence between titanium atoms and nitrogen atoms. However, it is known in the art of metallurgy that titanium nitride, having a cubic NaCl-type structure, is stable over a wide range of anion or cation deficiencies, for example in relative amounts from about $TiN_{0.42}$ to about $TiN_{1.0}$, or even, for example, to about $TiN_{1.16}$, (for example, if titanium nitride is prepared at low temperatures by reacting $NH_3$ with $TiCl_4$, see pg. 87, Transition Metal Carbides and Nitrides, by Louis E. Toth, 1971, Academic Press (London), incorporated herein by reference) all of which compounds are intended to fall within the scope of the invention. Indeed, so long as the particles according to the invention comprise significant amounts of titanium nitride, for example in an amount sufficient to provide measurable reheat in the absence of any other material, the remainder of the particles may well be elemental titanium, or titanium with small amounts of nitrogen dissolved, such that the average amount of nitrogen in the particles may be even lower than that stated in the formulas.

Titanium nitride particles useful according to the claimed invention may comprise significant amounts of titanium carbide and/or titanium oxide, so long as the titanium nitride particles are comprised of significant amounts of the titanium nitride, or so long as the total amount of titanium nitride and titanium carbide is at least 50 wt. %, for example. Thus, the titanium nitride may have relative amounts of titanium, carbon, and nitrogen within a wide range, such as a relative stoichiometry up to about $TiC_{0.5}N_{0.5}$, or to about $TiC_{0.8}N_{0.2}$, or to about $TiC_{0.7}N_{0.3}$ or even greater, with the carbon replacing nitrogen, and with the relative amounts of titanium to nitrogen (or nitrogen and carbon) as already described. Of course, the amount of titanium carbide phase which is present in the particles is not at all critical, so long as the desired effect is achieved. We expect that a source of titanium nitride having significant amounts of titanium carbide present would be entirely suited for practice according to the invention, especially for use as a reheat additive, since we have found titanium nitride containing significant amounts of titanium carbide to be entirely suitable as a reheat additive.

Titanium nitride compounds useful according to the claimed invention include those further described in Kirk-Othmer Encyclopedia of Chemical Technology, Vol 24, 4th ed., (1997) pp. 225-349, and especially pp. 231-232, the relevant portions of which are incorporated herein by reference.

Titanium nitride particles useful according to the claimed invention may be distinguished from other titanium compounds, such as those used as condensation catalysts, for example titanium alkoxides or simple chelates.

That is, if titanium compounds are used as condensation catalysts to form the polymer in the compositions of the claimed invention, such polymers will additionally contain titanium nitride particles, as described herein. Titanium nitride particles useful according to the invention may also be distinguished from elemental titanium and titanium alloys, as further described in Kirk-Othmer Encyclopedia of Chemical Technology, Vol. 24, 4th ed., (1997) pp. 186-224, incorporated herein by reference, although the invention does not exclude the presence of elemental titanium or titanium alloys in the titanium nitride particles, so long as the particles are comprised of significant amounts of titanium nitride, as already described.

Titanium nitride particles useful according to the invention for the improvement of one or more of reheat, color, or UV-blocking in polyester compositions include those having a range of particle sizes and particle size distributions, although we have found certain particle sizes and relatively narrow particle size distributions to be especially suitable in certain applications. For example, in some embodiments, such as those in which the polyester comprises PET, titanium nitride particles having a median particle size of about 0.02 micrometers (μm), and a relatively narrow particle size distribution, are advantageous as both bluing agents and reheat additives.

The titanium nitride particles according to the claimed invention may include one or more other metals or impurities, so long as the particles are comprised of significant amounts of titanium nitride, for example in an amount of at least 50 wt. %. Metals or non-metals that may be present in minor amounts up to a total of 50 wt. % or more include aluminum, tin, zirconium, manganese, germanium, iron, chromium, tungsten, molybdenum, vanadium, palladium, ruthenium, niobium, tantalum, cobalt, nickel, copper, gold, silver, silicon, and hydrogen, as well as carbon and oxygen, as already described.

Not wishing to be bound by any theory, we believe that the effectiveness of titanium nitride particles as a reheat additive and a UV-blocking additive may be a function of the absorptive properties of the titanium nitride, so that titanium nitrides containing amounts of other materials are suitable for use according to the invention so long as the particles are comprised of significant amounts of titanium nitride. Thus, the titanium nitride particles may comprise at least 50 wt. % titanium nitride, or at least 75 wt. % titanium nitride, or at least 90 wt. % titanium nitride, or at least 95 wt. % titanium nitride.

Again, not wishing to be bound by any theory, we think it likely that the effect of the titanium nitride particles of the invention as a bluing agent is due to the ability of such particles, especially with sizes in the range from about 1 nm to about 60 nm, to efficiently remove the light with about 600 nm wavelength (or yellow light) from the incident light. This removal of yellow light by the polyester compositions would cause the polyester article to appear to be blue. We note that larger, micron-scale particles provide much less of a bluing effect than do the submicron or nanometer-scale particles just described.

The titanium nitride particles may thus include elemental titanium, or may include other materials, such as other metals, so long as such other materials do not substantially affect the ability of the titanium nitride particles to increase the reheat properties of the polymer compositions, for example, or to increase the bluing effect, or the UV-blocking effect, as the case may be.

The titanium nitride particles may be coated with a fine layer of titanium oxide, and are useful according to the invention so long as the oxide coating does not substantially affect the ability of the titanium nitride particles to effect one of the intended advantages already described, such as to increase the reheat efficiency of the polymer compositions.

The particles may likewise be titanium nitride hollow spheres or titanium nitride-coated spheres, in which the core may be comprised of titanium nitride, of mixtures of titanium nitride with other materials, or of other materials in the substantial absence of titanium nitride. Again, not wishing to be bound by any theory, we think it likely that the effectiveness of titanium nitride as a reheat additive is a function of the absorptive properties of the titanium nitride, so that titanium nitride-coated particles are suitable for use according to the invention, so long as the coating thickness of titanium nitride is sufficient to provide adequate reheat properties. Thus, in various embodiments, the thickness of the coating may be from about 0.005 μm to about 10 μm, or from 0.01 μm to 5 μm, or from 0.01 μm to 0.5 μm. Alternatively, the coating thickness may range even smaller, such as from about 0.5 nm to about 100 nm, or from 0.5 nm to 50 nm, or from 0.5 nm to about 10 nm. Such titanium nitride coatings may also comprise small amounts of other materials, as already described.

The amount of titanium nitride particles present in the polyester compositions according to the invention may vary within a wide range, for example from about 0.5 ppm to about 1,000 ppm, or from 1 ppm to 500 ppm, or from 1 ppm to 200 ppm, or from 1 ppm to 100 ppm, or from 1 ppm to 50 ppm. The amount used may, of course, depend upon the desired effect(s), and the amounts may therefore vary, as further described elsewhere herein, depending upon whether the particles are provided as a reheat additive, as a bluing agent, or as a UV-blocking agent, or for any combination of these benefits.

For example, in some instances, loadings from about 1 ppm to about 10 ppm may be entirely adequate for improved reheat. Similarly, when a bluing effect is desired, amounts from about 5 ppm to about 50 ppm might be especially suitable. When significant UV-blocking protection is desired, such as in juice containers, the titanium nitride loading may be from about 1 ppm up to about 100 ppm, or even greater, when used as the primary or sole UV-blocking agent. Thermoplastic concentrates according to the invention may, of course, have amounts much greater than these, as further described elsewhere herein.

When used for UV-blocking effect, the titanium nitride particles of the invention may be used alone, or in combination with one or more known UV absorbers. When used in combination with known UV absorbers, the need for conventional UV absorbers might thereby be reduced. Also, because known UV absorbers tend to yellow the polymers in which they are used, the bluing effect of the titanium nitride particles would be an added benefit when used in combination with such UV absorbers, resulting in less need of additional bluing agents. And further, even in those cases in which the primary motivation is not to improve reheat, the resulting compositions might nonetheless exhibit improved reheat, making them suitable for uses that might otherwise require the presence of a separate reheat agent.

It should be noted that titanium nitride particles can be produced by numerous techniques, such as reacting the metal or oxide of titanium with nitrogen, or by plasma arc vapor synthesis, in which $TiCl_4$ is reacted with $NH_3$. Further details are described in the Powder Metallurgy entry in Kirk-Othmer *Encyclopedia of Chemical Technology*, Vol 16, 4th ed., (1995) pp. 353-392; details can also be found in *Transition Metal Carbides and Nitrides* by L. E. Toth, Academic Press 1971, pp1-28, each of which is incorporated herein by reference. The titanium nitride particles according to the invention may thus be produced by any known means, without limitation.

Shapes of titanium nitride powder which can be used in this invention include, but are not limited to, the following: acicular powder, angular powder, dendritic powder, equiaxed powder, flake powder, fragmented powder, granular powder, irregular powder, nodular powder, platelet powder, porous powder, rounded powder, and spherical powder. The particles may be of a filamentary structure, where the individual particles may be loose aggregates of smaller particles attached to form a bead or chain-like structure. The overall size of the particles may be variable, due to a variation in chain length and degree of branching.

The size of the titanium nitride particles may thus vary within a broad range depending on the method of production, and the numerical values for the particle sizes may vary according to the shape of the particles and the method of measurement. Particle sizes useful according to the invention may vary within a large range, especially when provided for reheat improvement or UV-blocking effect, such as from about 0.001 µm to about 100 µm, or from 0.01 µm to 45 µm, or from 0.01 µm to 10 µm, or from 0.01 µm to 5 µm. When the polyester composition comprises PET, we expect that particle sizes from 0.01 µm to 5 µm, or from 0.001 µm to 0.1 µm, would be especially suitable.

In certain embodiments, such as those in which a bluing effect is desired, the particles may range even smaller, such as from about 1 nm to about 1,000 nm, or from 1 nm to 500 nm, or from 1 nm to 300 nm, or from 1 nm to 200 nm, or from 1 nm to 50 nm. In these embodiments, the particles may thus be at least 1 nm in diameter, or at least 5 nm, up to about 200 nm, or up to about 300 nm, or up to about 500 nm. The size may thus vary within a wide range, depending upon the intended effect, such that particles from about 1 nm to about 100 nm, or from 1 nm to 60 nm, or from 1 nm to 50 nm, would be especially suited to improve one or more of the reheat properties, the color properties, or the UV-blocking properties, of the compositions.

In other embodiments, such as those in which UV-blocking effect is a significant or primary motivation for providing the titanium nitride particles, the size of the particles may vary from about 1 nm to about 100 nm, or from 1 nm to 50 nm, and will typically be present in a concentration from about 5 ppm to about 200 ppm, or from 5 ppm to 50 ppm.

In further embodiments, such as those in which a reheat additive effect is a significant or primary motivation for providing the titanium nitride particles, the size of the particles may vary from about 1 nm to about 500 nm, or from 1 nm to 300 nm, and will typically be present in a concentration from about 1 ppm to about 100 ppm, or from 5 ppm to 30 ppm.

In yet other embodiments, such as those in which a bluing effect is a significant or primary motivation for providing the titanium nitride particles, the size of the particles may vary from about 1 nm to about 100 nm, or from 5 nm to 50 nm, and will typically be present in a concentration from about 5 ppm to about 100 ppm, or from 5 ppm to 50 ppm.

The titanium nitride particles, which have a mean particle size suitable for the invention, may have irregular shapes and form chain-like structures, although roughly spherical particles may be preferred. The particle size and particle size distribution may be measured by methods such as those described in the Size Measurement of Particles entry of Kirk-Othmer *Encyclopedia of Chemical Technology*, Vol. 22, 4th ed., (1997) pp. 256-278, incorporated herein by reference. For example, particle size and particle size distributions may be determined using a Fisher Subsieve Sizer or a Microtrac Particle-Size Analyzer manufactured by Leeds and Northrop Company, or by microscopic techniques, such as scanning electron microscopy or transmission electron microscopy.

A range of particle size distributions may be useful according to the invention. The particle size distribution, as used herein, may be expressed by "span (S)," where S is calculated by the following equation:

$$S = \frac{d_{90} - d_{10}}{d_{50}}$$

where $d_{90}$ represents a particle size in which 90% of the volume is composed of particles having a diameter smaller than the stated $d_{90}$; and $d_{10}$ represents a particle size in which 10% of the volume is composed of particles having a diameter smaller than the stated $d_{10}$; and $d_{50}$ represents a particle size in which 50% of the volume is composed of particles having a diameter larger than the stated $d_{50}$ value, and 50% of the volume is composed of particles having a diameter smaller than the stated $d_{50}$ value.

Thus, particle size distributions in which the span (S) is from 0 to 10, or from 0 to 5, or from 0.01 to 2, for example, may be used according to the invention. Alternatively, the particle size distribution (S) may range even broader, such as from 0 to 15, or from 0 to 25, or from 0 to 50.

In order to obtain a good dispersion of titanium nitride particles in the polyester compositions, a concentrate, containing for example about 300 ppm to about 1000 ppm titanium nitride particles, or from 300 ppm to 1 wt %, or up to 10 wt %, or even higher, may be prepared using a polyester such as a commercial grade of PET. The concentrate may then be let down into a polyester at the desired concentration, ranging, for example, from 1 ppm to 500 ppm, or as already described.

Due to the properties of titanium nitride, the polyester compositions of this invention which contain titanium nitride particles as the reheat additive would not be expected to suffer from the problem of re-oxidation in the presence of an oxygen leak during solid-stating, as is the case with the antimony metal particles mentioned earlier. Thus, we expect that the reheat rate will tend to be less variable with titanium nitride particles, and fewer adjustments will need to be made to the reheat lamp settings during the reheat blow molding process.

The amount of titanium nitride particles used in the polyester will depend upon the particular application, the desired reduction in reheat time, and the toleration level in any reduction of a* or b* away from zero along with the movement of L* brightness values away from 100. Thus, in various embodiments, the quantity of titanium nitride particles may be at least 0.5 ppm, or at least 1 ppm, or at least 5 ppm. In some applications, the quantity of titanium nitride particles may be at least 10 ppm, in some cases at least 20 ppm, and even at least 25 ppm. The maximum amount of titanium nitride particles may be limited by one or more of the desired reheat rate, or maintenance in L*, a*, b* and other appearance properties, which may vary among applications or customer requirements. In some embodiments, the amount may be up to 500 ppm or more, or up to about 300 ppm, or up to about 250 ppm. In those applications where color, haze, and brightness are not important features to the application, however, the amount of titanium nitride particles used may be up to 1,000 ppm, or up to 5,000 ppm, or even up to 10,000 ppm. The amount can even exceed 10,000 ppm, especially when formulating a concentrate with titanium nitride particles, as discussed elsewhere herein.

The method by which the titanium nitride particles are incorporated into the polyester composition is illustrated by but not limited to the following. The titanium nitride particles can be added to the polymer reactant system, during or after polymerization, to the polymer melt, or to the molding powder or pellets or molten polyester in the injection-molding machine from which the bottle preforms are made. They may be added at locations including, but not limited to, proximate the inlet to an esterification reactor, proximate the outlet of an esterification reactor, at a point between the inlet and the outlet of an esterification reactor, anywhere along a recirculation loop, proximate the inlet to a prepolymer reactor, proximate the outlet to a prepolymer reactor, at a point between the inlet and the outlet of a prepolymer reactor, proximate the inlet to a polycondensation reactor, or at a point between the inlet and the outlet of a polycondensation reactor, or at a point between the outlet of a polycondensation reactor and a die for forming pellets, sheets, fibers, bottle preforms, or the like.

The titanium nitride particles may be added to a polyester polymer, such as PET, and fed to an injection molding machine by any method, including feeding the titanium nitride particles to the molten polymer in the injection molding machine, or by combining the titanium nitride particles with a feed of PET to the injection molding machine, either by melt blending or by dry blending pellets. The titanium nitride particles may be supplied neat, or in a concentrate form in a polymer such as PET, or as a dispersion in a liquid or solid carrier. Examples of suitable carriers include but are not limited to polyethylene glycol, mineral oil, hydrogenated castor oil, and glycerol monostearate.

Alternatively, the titanium nitride particles may be added to an esterification reactor, such as with and through the ethylene glycol feed optionally combined with phosphoric acid, to a prepolymer reactor, to a polycondensation reactor, or to solid pellets in a reactor for solid stating, or at any point in-between any of these stages. In each of these cases, the titanium nitride particles may be combined with PET or its precursors neat, as a concentrate containing PET, or diluted with a carrier. The carrier may be reactive to PET or may be non-reactive. The titanium nitride particles, whether neat or in a concentrate or in a carrier, and the bulk polyester, may be dried prior to mixing together. These titanium nitride particles may be dried in an atmosphere of dried air or other inert gas, such as nitrogen, and if desired, under sub-atmospheric pressure.

The impact of a reheat additive on the color of the polymer can be judged using a tristimulus color scale, such as the CIE L*a*b* scale. The L* value ranges from 0 to 100 and measures dark to light. The a* value measures red to green with positive values being red and negative values green. The b* value measures yellow to blue with yellow having positive values and blue negative values.

Color measurement theory and practice are discussed in greater detail in *Principles of Color Technology*, pp. 25-66 by Fred W. Billmeyer, Jr., John Wiley & Sons, New York (1981), incorporated herein by reference.

L* values for the polyester compositions as measured on twenty-ounce bottle preforms discussed herein should generally be greater than 45, or at least 60, or at least 65, or at least 70. Specifying a particular L* brightness does not imply that a preform having a particular sidewall cross-sectional thickness is actually used, but only that in the event the L* is measured, the polyester composition actually used is, for purposes of testing and evaluating the L* of the composition, injection molded to make a preform having a thickness of 0.154 inches.

The color of a desirable polyester composition, as measured in twenty-ounce bottle preforms having a nominal sidewall cross-sectional thickness of 0.154 inches, is generally indicated by an a* coordinate value preferably ranging from about minus 4.4 to plus 1.6, or minus 2.0 to about plus 0.5 or from about minus 2.0 to about plus 0.1. With respect to a b* coordinate value, it is generally desired to make a bottle preform having a b* value coordinate ranging from minus 8.6 to plus 10.2, or from minus 3.0, or from minus 1.5, to a positive value of less than plus 5.0, or less than plus 4.0, or less than plus 3.8, or less than 2.6.

The measurements of L*, a* and b* color values are conducted according to the following method. The instrument used for measuring b* color should have the capabilities of a HunterLab UltraScan XE, model U3350, using the CIE Lab Scale (L*, a*, b*), D65 (ASTM) illuminant, 10° observer and an integrating sphere geometry. Clear plaques, films, preforms, and bottles are tested in the transmission mode under ASTM D1746 "Standard Test Method for Transparency of Plastic Sheeting." The instrument for measuring color is set up under ASTM E1164 "Standard Practice for Obtaining Spectrophotometric Data for Object-Color Evaluation."

More particularly, the following test methods can be used, depending upon whether the sample is a preform, or a bottle. Color measurements should be performed using a HunterLab UltraScan XE (Hunter Associates Laboratory, Inc., Reston Va.), which employs diffuse/8° (illumination/view angle) sphere optical geometry, or equivalent equipment with these same basic capabilities. The color scale employed is the CIE L*a*b* scale with D65 illuminant and 10° observer specified.

Preforms having a mean outer diameter of 0.846 inches and a wall thickness of 0.154 inches are measured in regular transmission mode using ASTM D1746, "Standard Test Method for Transparency of Plastic Sheeting". Preforms are held in place in the instrument using a preform holder, available from HunterLab, and triplicate measurements are averaged, whereby the sample is rotated 90° about its center axis between each measurement.

The intrinsic viscosity (It.V.) values described throughout this description are set forth in dL/g unit as calculated from the inherent viscosity (Ih.V.) measured at 25° C. in 60/40 wt/wt phenol/tetrachloroethane. The inherent viscosity is calculated from the measured solution viscosity. The following equations describe these solution viscosity measurements, and subsequent calculations to Ih.V. and from Ih.V. to It.V:

$$\eta_{inh}=[\ln(t_s/t_o)]/C$$

where $\eta_{inh}$=Inherent viscosity at 25° C. at a polymer concentration of 0.50 g/100 mL of 60% phenol and 40% 1,1,2,2-tetrachloroethane
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0} (\eta_{sp}/C) = \lim_{C \to 0} \ln(\eta_r/C)$$

where $\eta_{int}$=Intrinsic viscosity
$\eta_r$=Relative viscosity=ts/to
$\eta_{sp}$=Specific viscosity=$\eta_r$−1

Instrument calibration involves replicate testing of a standard reference material and then applying appropriate mathematical equations to produce the "accepted" I.V. values.

Calibration Factor=Accepted IV of Reference Material/Average of Replicate Determinations Corrected IhV=Calculated IhV×Calibration Factor The intrinsic viscosity (It.V. or $\eta_{int}$) may be estimated using the Billmeyer equation as follows:

$$\eta_{int}=0.5\,[e^{0.5\times Corrected\,IhV}-1]+(0.75\times Corrected\,IhV)$$

Thus, a beneficial feature provided by polyester compositions containing titanium nitride particles is that the compositions and preforms made from these compositions typically have an improved reheat rate, expressed as a twenty-ounce bottle preform Reheat Improvement Temperature (RIT), relative to a control sample with no reheat additive.

The following test for reheat improvement temperature (RIT) is used herein, in order to determine the reheat improvement of the compositions described and claimed. Twenty-ounce bottle preforms (with an outer diameter of 0.846 inches and a sidewall cross-sectional thickness of 0.154 inches) are run through the oven bank of a Sidel SBO2/3 blow molding unit. The lamp settings for the Sidel blow molding unit are shown in Table 1. The preform heating time in the heaters is 38 seconds, and the power output to the quartz infrared heaters is set at 64%.

TABLE 1

Sidel SBO2/3 lamp settings.

Lamps ON = 1 OFF = 0

| Heating zone | Lamp power setting (%) | Heater 1 | Heater 2 | Heater 3 |
|---|---|---|---|---|
| Zone 8 | 0 | 0 | 0 | 0 |
| zone 7 | 0 | 0 | 0 | 0 |
| Zone 6 | 0 | 0 | 0 | 0 |
| Zone 5 | 90 | 1 | 0 | 1 |
| Zone 4 | 90 | 1 | 0 | 1 |
| Zone 3 | 90 | 1 | 0 | 1 |
| Zone 2 | 90 | 1 | 0 | 1 |
| Zone 1 | 90 | 1 | 1 | 1 |

In the test, a series of fifteen preforms is passed in front of the quartz infrared heaters and the average preform surface temperature of the middle five preforms is measured. All preforms are tested in a consistent manner. The preform reheat improvement temperature (RIT) is then calculated by comparing the difference in preform surface temperature of the target samples containing a reheat additive with that of the same polymer having no reheat additive. The higher the RIT value, the higher the reheat rate of the composition.

Thus, in various embodiments, the twenty-ounce bottle preform reheat improvement temperature of the polyester compositions according to the claimed invention containing titanium nitride particles, may be from about 0.1° C. to about 11° C., from 1° C. to 11° C., or from 1° C. to values even higher than 11° C., such as 32° C., depending on the desired applications.

In some embodiments, the polyester compositions containing titanium nitride particles, and preforms made from these compositions, may have a b* color of less than 10.2, or less than 3.5, or less than 3, and in any case greater than minus 2, or greater than minus 9. Similarly, preforms from the polyester compositions according to the invention may have an L* brightness of at least 45, or at least 60, or at least 65, or at least 70.

Preforms containing titanium nitride according to the invention often showed a blue tinge (a lower b* value than control samples).

The polyester compositions according to the invention may have improved solid-stating stability compared to polyester compositions containing conventional reheat additives. The solid-stating stability is here defined as little or no change in the reheat rate after the polymer undergoes solid-state polymerization in the presence of an air leak during the process. Constant reheat rate is important for certain bottle making processes, such as blow-molding. If the reheat rate varies as a result of the oxidation of the reheat additive, as is the case with antimony metal, then constant adjustments must be made to the oven power settings of the blow molding machine in order to maintain a consistent preform surface temperature from one preform to another.

According to the invention, in various embodiments, there are also provided concentrate compositions comprising titanium nitride particles in an amount of at least 0.05 wt. %, or at least 2 wt. %, and up to about 20 wt. %, or up to 35 wt. %, and a thermoplastic polymer normally solid at 25° C. and 1 atm such as a polyester, polyolefin, polyamide, or polycarbonate in an amount of at least 65 wt. %, or at least 80 wt. %, or up to 99 wt. % or more, each based on the weight of the concentrate composition. The concentrate may be in liquid, molten state, or solid form. The converter of polymer to preforms has the flexibility of adding titanium nitride particles to bulk polyester at the injection molding stage continuously, or intermittently, in liquid molten form or as a solid blend, and further adjusting the amount of titanium nitride particles contained in the preform by metering the amount of concentrate to fit the end use application and customer requirements.

The concentrate may be made by mixing titanium nitride particles with a polymer such as a polycarbonate, a polyester, a polyolefin, or mixtures of these, in a single or twin-screw extruder, and optionally compounding with other reheat additives. A suitable polycarbonate is bisphenol A polycarbonate. Suitable polyolefins include, but are not limited to, polyethylene and polypropylene, and copolymers thereof. Melt temperatures should be at least as high as the melting point of the polymer. For a polyester, such as PET, the melt temperatures are typically in the range of 250°-310° C. Preferably, the melt compounding temperature is maintained as low as possible. The extrudate may be withdrawn in any form, such as a strand form, and recovered according to the usual way such as cutting.

The concentrate may be prepared in a similar polyester as used in the final article. However, in some cases it may be advantageous to use another polymer in the concentrate, such as a polyolefin. In the case where a polyolefin/titanium nitride particles concentrate is blended with the polyester, the polyolefin can be incorporated as a nucleator additive for the bulk polyester.

The concentrate may be added to a bulk polyester or anywhere along the different stages for manufacturing PET, in a manner such that the concentrate is compatible with the bulk polyester or its precursors. For example, the point of addition or the It.V. of the concentrate may be chosen such that the It.V. of the polyethylene terephthalate and the It.V. of the concentrate are similar, e.g. +/−0.2 It.V. measured at 25° C. in a 60/40 wt/wt phenol/tetrachloroethane solution. A concentrate can be made with an It.V. ranging from 0.3 dL/g to 1.1 dL/g to match the typical It.V. of a polyethylene terephthalate under manufacture in the polycondensation stage. Alternatively, a concentrate can be made with an It.V. similar to that of solid-stated pellets used at the injection molding stage (e.g. It.V. from 0.6 dL/g to 1.1 dL/g).

Other components can be added to the polymer compositions of the present invention to enhance the performance properties of the polyester composition. For example, crystallization aids, impact modifiers, surface lubricants, denesting agents, stabilizers, antioxidants, ultraviolet light absorbing agents, catalyst deactivators, colorants, nucleating agents, acetaldehyde reducing compounds, other reheat enhancing aids, fillers, anti-abrasion additives, and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or polyols generally known in the art. All of these additives and many others and their use are well known in the art. Any of these compounds can be used in the present composition.

The polyester compositions of the present invention may be used to form preforms used for preparing packaging containers. The preform is typically heated above the glass transition temperature of the polymer composition by passing the preform through a bank of quartz infrared heating lamps, positioning the preform in a bottle mold, and then blowing pressurized air through the open end of the mold.

A variety of other articles can be made from the polyester compositions of the invention, including those in which reheat is neither necessary nor desirable. Articles include sheet, film, bottles, trays, other packaging, rods, tubes, lids, fibers and injection molded articles. Any type of bottle can be made from the polyester compositions of the invention. Thus, in one embodiment, there is provided a beverage bottle made from PET suitable for holding water. In another embodiment, there is provided a heat-set beverage bottle suitable for holding beverages which are hot-filled into the bottle. In yet another embodiment, the bottle is suitable for holding carbonated soft drinks. Further, in yet another embodiment, the bottle is suitable for holding alcoholic beverages.

The titanium nitride particles used according to the invention may affect the reheat rate, UV light extinction (the UV light that is absorbed and/or scattered), brightness and color of the molded articles (whether preforms or finished bottles such as stretch blow-molded bottles, or extrusion blow molded bottles), and provide improved resistance of the contents to the effects of UV light. Any one or more of these performance characteristics may be adjusted by varying the amount of the particles used, or by changing the particle size, particle shape, or the particle size distribution.

The invention also provides processes for making polyester preforms or injection-molded bottles that comprise feeding a liquid or solid bulk polyester and a liquid, molten or solid polyester concentrate composition to a machine for manufacturing the preform or bottle, the concentrate being as described elsewhere. According to the invention, not only may the concentrate be added at the stage for making preforms or injection-molded bottles, but in other embodiments, there are provided processes for the manufacture of polyester compositions that comprise adding a concentrate polyester composition to a melt phase for the manufacture of virgin polyester polymers, the concentrate comprising titanium nitride particles and at least 65 wt. % of a polyester polymer. Alternatively, the titanium nitride particles may be added to recycled PET to form the concentrate.

The polyester compositions according to the invention may have a good reheat rate with acceptable or even improved visual appearance properties, and improved UV-blocking properties. The resulting polymers may also have excellent solid stating stability, if such process is used in the polyester manufacturing process.

In yet another embodiment of the invention, there is thus provided a polyester beverage bottle made from a preform, wherein the preform has a RIT of 5° C. or more, and an L* value of 60 or more.

In each of the described embodiments, there are also provided additional embodiments encompassing the processes for the manufacture of each, and the preforms and articles, and in particular bottles, blow-molded from the preforms, as well as their compositions containing titanium nitride particles.

The polyester compositions of this invention may be any thermoplastic polymers, optionally containing any number of ingredients in any amounts, provided that the polyester component of the polymer is present in an amount of at least 30 wt. %, or at least 50 wt. %, or at least 80 wt. %, or even 90 wt. % or more, based on the weight of the polymer, the backbone of the polymer typically including repeating terephthalate or naphthalate units.

Examples of suitable polyester polymers include one or more of: PET, polyethylene naphthalate (PEN), poly(1,4-cyclo-hexylenedimethylene) terephthalate (PCT), poly(ethylene-co-1,4-cyclohexylenedimethylene terephthalate) (PETG), copoly(1,4-cyclohexylene dimethylene/ethylene terephthalate) (PCTG), poly(1,4-cyclohexylene dimethylene terephthalate-co-isophthalate) (PCTA), poly(ethylene terephthalate-co-isophthalate) (PETA) and their blends or their copolymers. The form of the polyester composition is not limited, and includes a melt in the manufacturing process or in the molten state after polymerization, such as may be found in an injection molding machine, and in the form of a liquid, pellets, preforms, and/or bottles. Polyester pellets may be isolated as a solid at 25° C. and 1 atm in order for ease of transport and processing. The shape of the polyester pellet is not limited, and is typified by regular or irregular shaped discrete particles and may be distinguished from a sheet, film, or fiber.

Examples of suitable polyesters include those described in U.S. Pat. No. 4,359,570, incorporated herein by reference in its entirety.

It should also be understood that as used herein, the term polyester is intended to include polyester derivatives, including, but not limited to, polyether esters, polyester amides, and polyetherester amides. Therefore, for simplicity, throughout the specification and claims, the terms polyester, polyether ester, polyester amide, and polyetherester amide may be used interchangeably and are typically referred to as polyester, but it is understood that the particular polyester species is dependent on the starting materials, i.e., polyester precursor reactants and/or components.

The location of the titanium nitride particles within the polyester compositions is not limited. The titanium nitride particles may be disposed anywhere on or within the polyester polymer, pellet, preform, or bottle. Preferably, the polyester polymer in the form of a pellet forms a continuous phase. By being distributed "within" the continuous phase we mean that the titanium nitride particles are found at least within a portion of a cross-sectional cut of the pellet. The titanium nitride particles may be distributed within the polyester polymer randomly, distributed within discrete regions, or distributed only within a portion of the polymer. In a specific embodiment, the titanium nitride particles are disposed randomly throughout the polyester polymer composition as by way of adding the titanium nitride particles to a melt, or by mixing the titanium nitride particles with a solid polyester composition followed by melting and mixing.

The titanium nitride particles may be added in an amount so as to achieve a twenty-ounce bottle preform RIT of at least 3° C., or at least 5° C., or at least 10° C., while maintaining acceptable preform color/appearance properties.

Suitable amounts of titanium nitride particles in the polyester compositions (other than polyester concentrate compositions as discussed elsewhere), preforms, and containers, may thus range from about 0.5 ppm to about 500 ppm, based on the weight of the polymer in the polyester compositions, or as already described herein. The amount of the titanium nitride particles used may depend on the type and quality of the titanium nitride particles, the particle size, surface area, the morphology of the particle, and the level of desired reheat rate improvement, or color improvement, or UV-blocking effect, as the case may be.

The particle size may be measured with a laser diffraction type particle size distribution meter, or scanning or transmission electron microscopy methods, or size exclusion chromatography. Alternatively, the particle size can be correlated by a percentage of particles screened through a mesh.

In various other embodiments, there are provided polyester compositions, whether in the form of a melt, pellets, sheets, preforms, and/or bottles, comprising at least 0.5 ppm, or at least 50 ppm, or at least 100 ppm titanium nitride particles, having a $d_{50}$ particle size of less than 100 µm, or less than 50 µm, or less than 1 µm or less, wherein the polyester compositions have a preform L* value of 70 or more, or 79 or more, or even 80 or more, and an RIT up to 10° C., or at least 5° C., or at least 3° C.

According to various embodiments of the invention, titanium nitride particles may be added at any point during polymerization, which includes to the esterification zone, to the polycondensation zone comprised of the prepolymer zone and the finishing zone, to or prior to the pelletizing zone, and at any point between or among these zones. The titanium nitride particles may also be added to solid-stated pellets as they are exiting the solid-stating reactor. Furthermore, titanium nitride particles may be added to the PET pellets in combination with other feeds to the injection molding machine, or may be fed separately to the injection molding machine. For clarification, the titanium nitride particles may be added in the melt phase or to an injection molding machine without solidifying and isolating the polyester composition into pellets. Thus, the titanium nitride particles can also be added in a melt-to-mold process at any point in the process for making the preforms. In each instance at a point of addition, the titanium nitride particles can be added as a powder neat, or in a liquid, or a polymer concentrate, and can be added to virgin or recycled PET, or added as a polymer concentrate using virgin or recycled PET as the PET polymer carrier.

In other embodiments, the invention relates to processes for the manufacture of polyester compositions containing titanium nitride particles, such as polyalkylene terephthalate or naphthalate polymers made by transesterifying a dialkyl terephthalate or dialkyl naphthalate or by directly esterifying terephthalic acid or naphthalene dicarboxylic acid.

Thus, there are provided processes for making polyalkylene terephthalate or naphthalate polymer compositions by transesterifying a dialkyl terephthalate or naphthalate or directly esterifying a terephthalic acid or naphthalene dicarboxylic acid with a diol, adding titanium nitride particles to the melt phase for the production of a polyalkylene terephthalate or naphthalate after the prepolymer zone, or to polyalkylene terephthalate or naphthalate solids, or to an injection molding machine for the manufacture of bottle preforms.

Each of these process embodiments, along with a description of the polyester polymers, is now explained in further detail.

The polyester polymer may be PET, PEN, or copolymers or mixtures, thereof. A preferred polyester polymer is polyethylene terephthalate. As used herein, a polyalkylene terephthalate polymer or polyalkylene naphthalate polymer means a polymer having polyalkylene terephthalate units or polyalkylene naphthalate units in an amount of at least 60 mole % based on the total moles of units in the polymer, respectively. Thus, the polymer may contain ethylene terephthalate or naphthalate units in an amount of at least 85 mole %, or at least 90 mole %, or at least 92 mole %, or at least 96 mole %, as measured by the mole % of ingredients in the finished polymer. Thus, a polyethylene terephthalate polymer may comprise a copolyester of ethylene terephthalate units and other units derived from an alkylene glycol or aryl glycol with an aliphatic or aryl dicarboxylic acid.

While reference is made in certain instances to polyethylene terephthalate, it is to be understood that the polymer may also be a polyalkylene naphthalate polymer.

Polyethylene terephthalate can be manufactured by reacting a diacid or diester component comprising at least 60 mole % terephthalic acid or $C_1$-$C_4$ dialkylterephthalate, or at least 70 mole %, or at least 85 mole %, or at least 90 mole %, and for many applications at least 95 mole %, and a diol component comprising at least 60 mole % ethylene glycol, or at least 70 mole %, or at least 85 mole %, or at least 90 mole %, and for many applications, at least 95 mole %. It is preferable that the diacid component is terephthalic acid and the diol component is ethylene glycol. The mole percentage for all the diacid component(s) totals 100 mole %, and the mole percentage for all the diol component(s) totals 100 mole %.

The polyester pellet compositions may include admixtures of polyalkylene terephthalates, PEN, or mixtures thereof, along with other thermoplastic polymers, such as polycarbonates and polyamides. It is preferred in many instances that the polyester composition comprise a majority of a polyalkylene terephthalate polymers or PEN polymers, or in an amount of at least 80 wt. %, or at least 95 wt. %, based on the weight of polymers (excluding fillers, compounds, inorganic compounds or particles, fibers, impact modifiers, or other polymers which may form a discontinuous phase). In addition to units derived from terephthalic acid, the acid component of the present polyester may be modified with, or replaced by, units derived from one or more other dicarboxylic acids, such as aromatic dicarboxylic acids preferably having from 8 to 14 carbon atoms, aliphatic dicarboxylic acids preferably having 4 to 12 carbon atoms, or cycloaliphatic dicarboxylic acids preferably having 8 to 12 carbon atoms.

Examples of dicarboxylic acid units useful for the acid component are units from phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being preferable.

It should be understood that use of the corresponding acid anhydrides, esters, and acid chlorides of these acids is included in the term "dicarboxylic acid".

In addition to units derived from ethylene glycol, the diol component of the present polyester may be modified with, or replaced by, units from additional diols including cycloaliphatic diols preferably having 6 to 20 carbon atoms and aliphatic diols preferably having 2 to 20 carbon atoms. Examples of such diols include diethylene glycol (DEG); triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1, 3); hexanediol-(1,3); 1,4-di(hydroxyethoxy)-benzene; 2,2-bis-(4-hydroxycyclohexyl)-propane; 2,4-dihydroxy-1,1,3,3-tetramethyl-cyclobutane;

2,2-bis-(3-hydroxyethoxyphenyl)-propane; and 2,2-bis-(4-hydroxypropoxyphenyl)-propane.

The polyester compositions of the invention may be prepared by conventional polymerization procedures well-known in the art sufficient to effect esterification and polycondensation. Polyester melt phase manufacturing processes include direct condensation of a dicarboxylic acid with a diol optionally in the presence of esterification catalysts in the esterification zone, followed by polycondensation in the prepolymer and finishing zones in the presence of a polycondensation catalyst; or else ester interchange usually in the presence of a transesterification catalyst in the esterification zone, followed by prepolymerization and finishing in the presence of a polycondensation catalyst, and each may optionally be subsequently solid-stated according to known methods. After melt phase and/or solid-state polycondensation the polyester polymer compositions typically have an intrinsic viscosity (It.V.) ranging from 0.55 dL/g to about 0.70 dL/g as precursor pellets, and an It.V. ranging from about 0.70 dL/g to about 1.15 dL/g for solid stated pellets.

Alternatively, the polyester composition may be prepared entirely in the melt phase, by continuing melt-phase polycondensation such that the polyester polymer compositions made in this manner have an It.V. of at least 1.0 dL/g, or at least 1.1 dL/g, or at least 1.2 dL/g.

To further illustrate, a mixture of one or more dicarboxylic acids, preferably aromatic dicarboxylic acids, or ester forming derivatives thereof, and one or more diols, are continuously fed to an esterification reactor operated at a temperature of between about 200° C. and 300° C., typically between 240° C. and 290° C., and at a pressure of about 1 psig up to about 70 psig. The residence time of the reactants typically ranges from between about one and five hours. Normally, the dicarboxylic acid is directly esterified with diol(s) at elevated pressure and at a temperature of about 240° C. to about 270° C. The esterification reaction is continued until a degree of esterification of at least 60% is achieved, but more typically until a degree of esterification of at least 85% is achieved to make the desired monomer. The esterification monomer reaction is typically uncatalyzed in the direct esterification process and catalyzed in transesterification processes. Polycondensation catalysts may optionally be added in the esterification zone along with esterification/transesterification catalysts.

Typical esterification/transesterification catalysts which may be used include titanium alkoxides, dibutyl tin dilaurate, used separately or in combination, optionally with zinc, manganese, or magnesium acetates or benzoates and/or other such catalyst materials as are well known to those skilled in the art. Phosphorus-containing compounds and cobalt compounds may also be present in the esterification zone. The resulting products formed in the esterification zone include bis(2-hydroxyethyl) terephthalate (BHET) monomer, low molecular weight oligomers, DEG, and water as the condensation by-product, along with other trace impurities formed by the reaction of the catalyst and other compounds such as colorants or the phosphorus-containing compounds. The relative amounts of BHET and oligomeric species will vary depending on whether the process is a direct esterification process, in which case the amount of oligomeric species are significant and even present as the major species, or a transesterification process, in which case the relative quantity of BHET predominates over the oligomeric species. The water is removed as the esterification reaction proceeds and excess ethylene glycol is removed to provide favorable equilibrium conditions. The esterification zone typically produces the monomer and oligomer mixture, if any, continuously in a series of one or more reactors. Alternatively, the monomer and oligomer mixture could be produced in one or more batch reactors.

It is understood, however, that in a process for making PEN, the reaction mixture will contain monomeric species such as bis(2-hydroxyethyl) naphthalate and its corresponding oligomers. Once the ester monomer is made to the desired degree of esterification, it is transported from the esterification reactors in the esterification zone to the polycondensation zone comprised of a prepolymer zone and a finishing zone.

Polycondensation reactions are initiated and continued in the melt phase in a prepolymerization zone and finished in the melt phase in a finishing zone, after which the melt may be solidified into precursor solids in the form of chips, pellets, or any other shape. For convenience, solids are referred to as pellets, but it is understood that a pellet can have any shape, structure, or consistency. If desired, the polycondensation reaction may be continued by solid-stating the precursor pellets in a solid-stating zone.

Although reference is made to a prepolymer zone and a finishing zone, it is to be understood that each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors or even one or more reaction steps or sub-stages performed in a single reactor vessel. In some reactor designs, the prepolymerization zone represents the first half of polycondensation in terms of reaction time, while the finishing zone represents the second half of polycondensation. While other reactor designs may adjust the residence time between the prepolymerization zone to the finishing zone at about a 2:1 ratio, a common distinction in all designs between the prepolymerization zone and the finishing zone is that the latter zone operates at a higher temperature, lower pressure, and a higher surface renewal rate than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight monomers and minor amounts of oligomers are polymerized via polycondensation to form polyethylene terephthalate polyester (or PEN polyester) in the presence of a catalyst. If the catalyst was not added in the monomer esterification stage, the catalyst is added at this stage to catalyze the reaction between the monomers and low molecular weight oligomers to form prepolymer and split off the diol as a by-product. If a polycondensation catalyst was added to the esterification zone, it is typically blended with the diol and fed into the esterification reactor as the diol feed. Other compounds such as phosphorus-containing compounds, cobalt compounds, and colorants can also be added in the prepolymerization zone. These compounds may, however, be added in the finishing zone instead of or in addition to the prepolymerization zone.

In a typical DMT-based process, those skilled in the art recognize that other catalyst material and points of adding the catalyst material and other ingredients vary from a typical direct esterification process.

Typical polycondensation catalysts include the compounds of antimony, titanium, germanium, zinc and tin in an amount ranging from 0.1 ppm to 1,000 ppm based on the weight of resulting polyester polymer. A common polymerization catalyst added to the prepolymerization zone is an antimony-based polymerization catalyst. Suitable antimony-based catalysts include antimony (III) and antimony (V) compounds recognized in the art, and in particular, diol-soluble antimony (III) and antimony (V) compounds with antimony (III) being most commonly used. Other suitable compounds include those antimony compounds that react with, but are not necessarily soluble in, the diols, with examples of such compounds including antimony (III) oxide. Specific examples of suitable antimony catalysts include antimony (III) oxide and antimony (III) acetate, antimony (III) glycolates, antimony (III) ethyleneglycoxide and mixtures thereof, with antimony (III) oxide being preferred. The preferred amount of antimony catalyst added is that effective to provide a level of between about 75 ppm and about 400 ppm of antimony by weight of the resulting polyester.

This prepolymer polycondensation stage generally employs a series of two or more vessels and is operated at a temperature of between about 250° C. and 305° C. for between about one and four hours. During this stage, the It.V. of the monomers and oligomers is typically increased up to about no more than 0.35 dL/g. The diol byproduct is removed from the prepolymer melt using an applied vacuum ranging from 15 torr to 70 torr to drive the reaction to completion. In this regard, the polymer melt is typically agitated to promote the escape of the diol from the polymer melt and to assist the highly viscous polymer melt in moving through the polymerization vessels. As the polymer melt is fed into successive vessels, the molecular weight and thus the intrinsic viscosity of the polymer melt increases. The temperature of each vessel is generally increased and the pressure decreased to allow for a greater degree of polymerization in each successive vessel. However, to facilitate removal of glycols, water, alcohols, aldehydes, and other reaction products, the reactors are typically run under a vacuum or purged with an inert gas. Inert gas is any gas which does not cause unwanted reaction or product characteristics at reaction conditions. Suitable gases include, but are not limited to, carbon dioxide, argon, helium, and nitrogen.

Once an It.V. of typically no greater than 0.35 dL/g, or no greater than 0.40 dL/g, or no greater than 0.45 dL/g, is obtained, the prepolymer is fed from the prepolymer zone to a finishing zone where the second half of polycondensation is continued in one or more finishing vessels ramped up to higher temperatures than present in the prepolymerization zone, to a value within a range of from 280° C. to 305° C. until the It.V. of the melt is increased from the It.V of the melt in the prepolymerization zone (typically 0.30 dL/g but usually not more than 0.35 dL/g) to an It.V in the range of from about 0.50 dL/g to about 0.70 dL/g. The final vessel, generally known in the industry as the "high polymerizer," "finisher," or "polycondenser," is operated at a pressure lower than used in the prepolymerization zone, typically within a range of between about 0.8 torr and 4.0 torr, or from about 0.5 torr to about 4.0 torr. Although the finishing zone typically involves the same basic chemistry as the prepolymer zone, the fact that the size of the molecules, and thus the viscosity, differs, means that the reaction conditions also differ. However, like the prepolymer reactor, each of the finishing vessel(s) is connected to a flash vessel and each is typically agitated to facilitate the removal of ethylene glycol.

Alternatively, if a melt-phase-only polycondensation process is employed in the absence of a solid-stating step, the finisher is operated under similar temperatures and pressures, except that the It.V. of the melt is increased in the finisher to an It.V. in the range of from about 0.70 dL/g up to about 1.0 dL/g, or up to 1.1 dL/g, or up to 1.2 dL/g.

The residence time in the polycondensation vessels and the feed rate of the ethylene glycol and terephthalic acid into the esterification zone in a continuous process is determined in part based on the target molecular weight of the polyethylene terephthalate polyester. Because the molecular weight can be readily determined based on the intrinsic viscosity of the polymer melt, the intrinsic viscosity of the polymer melt is generally used to determine polymerization conditions, such as temperature, pressure, the feed rate of the reactants, and the residence time within the polycondensation vessels.

Once the desired It.V. is obtained in the finisher, the melt is fed to a pelletization zone where it is filtered and extruded into the desired form. The polyester polymers of the present invention are filtered to remove particulates over a designated size, followed by extrusion in the melt phase to form polymer sheets, filaments, or pellets. Although this zone is termed a "pelletization zone", it is understood that this zone is not limited to solidifying the melt into the shape of pellets, but includes solidification into any desired shape. Preferably, the polymer melt is extruded immediately after polycondensation. After extrusion, the polymers are quenched, preferably by spraying with water or immersing in a water trough, to promote solidification. The solidified condensation polymers are cut into any desired shape, including pellets.

Alternatively, once the polyester polymer is manufactured in the melt phase polymerization, it may be solidified. The method for solidifying the polyester polymer from the melt phase process is not limited. For example, molten polyester polymer from the melt phase may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer may be drawn into strands, contacted with a cool fluid, and cut into pellets, or the polymer may be pelletized at the die head, optionally underwater. The polyester polymer melt optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers, and centrifuged pelletizers.

The polyester polymer of the invention may be partially crystallized to produce semi-crystalline particles. The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the glass transition temperature ($T_g$) of the polyester polymer, preferably at 140° C. to 190° C.; or any other means known in the art. Also, the polymer may be strain crystallized. The polymer may also be fed to a crystallizer at a polymer temperature below its $T_g$ (from the glass), or it may be fed to a crystallizer at a polymer temperature above its $T_g$. For example, molten polymer from the melt phase polymerization reactor may be fed through a die plate and cut underwater, and then immediately fed to an underwater thermal crystallization reactor where the polymer is crystallized underwater. Alternatively, the molten polymer may be cut, allowed to cool to below its $T_g$, and then fed to an underwater thermal crystallization apparatus or any other suitable crystallization apparatus. Or, the molten polymer may be cut in any conventional manner, allowed to cool to below its $T_g$, optionally stored, and then crystallized. Optionally, the crystallized polyester may be solid stated according to known methods.

As known to those of ordinary skill in the art, the pellets formed from the condensation polymers, in some circumstances, may be subjected to a solid-stating zone wherein the solids are first crystallized followed by solid-state polymerization (SSP) to further increase the It.V. of the polyester composition solids from the It.V exiting the melt phase to the desired It.V. useful for the intended end use. Typically, the It.V. of solid stated polyester solids ranges from 0.70 dL/g to 1.15 dL/g. In a typical SSP process, the crystallized pellets are subjected to a countercurrent flow of nitrogen gas heated to 180° C. to 220° C., over a period of time as needed to increase the It.V. to the desired target.

Thereafter, polyester polymer solids, whether solid stated or not, are re-melted and re-extruded to form items such as containers (e.g., beverage bottles), filaments, films, or other applications. At this stage, the pellets are typically fed into an injection molding machine suitable for making preforms which are stretch blow molded into bottles.

As noted, titanium nitride particles may be added at any point in the melt phase or thereafter, such as to the esterification zone, to the prepolymerization zone, to the finishing zone, or to the pelletizing zone, or at any point between each of these zones, such as to metering devices, pipes, and mixers. The titanium nitride particles can also be added to the pellets in a solid stating zone within the solid stating zone or as the pellets exit the solid-stating reactor. Furthermore, the titanium nitride particles may be added to the pellets in combination with other feeds to the injection molding machine or fed separately to the injection molding machine.

If the titanium nitride particles are added to the melt phase, it is desirable to use particles having a small enough particle size to pass through the filters in the melt phase, and in particular the pelletization zone. In this way, the particles will not clog up the filters as seen by an increase in gear pump pressure needed to drive the melt through the filters. However, if desired, the titanium nitride particles can be added after the pelletization zone filter and before or to the extruder of the injection molding machine.

In addition to adding titanium nitride particles to virgin polymer, whether to make a concentrate, or added neat or as a dispersion to the melt phase after the prepolymerization reactors or to an injection molding zone, titanium nitride particles may also be added to post-consumer recycle (PCR) polymer. PCR containing titanium nitride particles is added to virgin bulk polymers by solid/solid blending or by feeding both solids to an extruder. Alternatively, PCR polymers containing titanium nitride particles are advantageously added to the melt phase for making virgin polymer between the prepolymerization zone and the finishing zone. The It.V. of the virgin melt phase after the prepolymerization zone is sufficiently high at that point to enable the PCR to be melt blended with the virgin melt. Alternatively, PCR may be added to the finisher. In either case, the PCR added to the virgin melt phase may contain the titanium nitride particles. The titanium nitride particles may be combined with PCR by any of the methods noted above, or separately fed to and melt blended in a heated vessel, followed by addition of the PCR melt containing the titanium nitride particles to the virgin melt phase at these addition points.

Other components can be added to the compositions of the present invention to enhance the performance properties of the polyester polymers. For example, crystallization aids, impact modifiers, surface lubricants, denesting agents, compounds, antioxidants, ultraviolet light absorbing agents, catalyst deactivators, colorants, nucleating agents, acetaldehyde reducing compounds, other reheat rate enhancing aids, sticky bottle additives such as talc, and fillers and the like can be included. The polymer may also contain small amounts of branching agents such as trifunctional or tetrafunctional comonomers such as trimellitic anhydride, trimethylol propane, pyromellitic dianhydride, pentaerythritol, and other polyester forming polyacids or diols generally known in the art. All of these additives and many others and their use are well known in the art and do not require extensive discussion. Any of these compounds can be used in the present composition. It is preferable that the present composition be essentially comprised of a blend of thermoplastic polymer and titanium nitride particles, with only a modifying amount of other ingredients being present.

Examples of other reheat rate enhancing additives that may be used in combination with titanium nitride particles include carbon black, antimony, tin, copper, silver, gold, palladium, platinum, black iron oxide, and the like, as well as near infrared absorbing dyes, including, but not limited to, those disclosed in U.S. Pat. No. 6,197,851, incorporated herein by reference.

The compositions of the present invention optionally may contain one or more additional UV-absorbing compounds. One example includes UV-absorbing compounds which are covalently bound to the polyester molecule as either a comonomer, a side group, or an end group. Suitable UV-absorbing compounds are thermally stable at polyester processing temperatures, absorb in the range of from about 320 nm to about 380 nm, and migrate minimally from the polymer. The UV-absorbing compounds preferably provide less than about 20%, more preferably less than about 10%, transmittance of UV light having a wavelength of 370 nm through a bottle wall or sample that is 0.012 inches thick. Suitable chemically reactive UV absorbing compounds may include, for example, substituted methine compounds.

Suitable compounds, their methods of manufacture and incorporation into polyesters include those disclosed in U.S. Pat. No. 4,617,374, the disclosure of which is incorporated herein by reference. Other suitable UV-absorbing materials include benzophenone, benzotriazole, triazine, benzoxazinone derivatives. These UV-absorbing compound(s) may be present in amounts between about 1 ppm to about 5,000 ppm by weight, preferably from about 2 ppm to about 1,500 ppm, and more preferably between about 10 ppm and about 1000 ppm by weight. Dimers of the UV absorbing compounds may also be used. Mixtures of two or more UV absorbing compounds may be used. Moreover, because the UV absorbing compounds are reacted with or copolymerized into the backbone of the polymer, the resulting polymers display improved processability including reduced loss of the UV absorbing compound due to plateout and/or volatilization and the like.

The polyester compositions of the present invention are suitable for forming a variety of shaped articles, including films, sheets, tubes, preforms, molded articles, containers and the like. Suitable processes for forming the articles are known and include extrusion, extrusion blow molding, melt casting, injection molding, stretch blow molding, thermoforming, and the like.

The polyesters of this invention may also, optionally, contain color stabilizers, such as certain cobalt compounds. These cobalt compounds can be added as cobalt acetates or cobalt alcoholates (cobalt salts or higher alcohols). They can be added as solutions in ethylene glycol. Polyester resins containing high amounts of the cobalt additives can be prepared as a masterbatch for extruder addition. The addition of the cobalt additives as color toners is a process used to further minimize or eliminate the yellow color, measured as b*, of the resin. Other cobalt compounds such as cobalt aluminate, cobalt benzoate, cobalt chloride and the like may also be used as color stabilizers. It is also possible to add certain diethylene glycol (DEG) inhibitors to reduce or prevent the formation of DEG in the final resin product. Preferably, a specific type of DEG inhibitor would comprise a sodium acetate-containing composition to reduce formation of DEG during the esterification and polycondensation of the applicable diol with the dicarboxylic acid or hydroxyalkyl, or hydroxyalkoxy substituted carboxylic acid. It is also possible to add stress crack inhibitors to improve stress crack resistance of bottles, or sheeting, produced from this resin.

With regard to the type of polyester which can be utilized, any high clarity, neutral hue polyester, copolyester, etc., in the form of a resin, powder, sheet, etc., can be utilized to which it is desired to improve the reheat time or the heat-up time of the resin. Thus, polyesters made from either the dimethyl terephthalate or the terephthalic acid route or various homologues thereof as well known to those skilled in the art along with conventional catalysts in conventional amounts and utilizing conventional processes can be utilized according to the present invention. Moreover, the type of polyester can be made according to melt polymerization, solid state polymerization, and the like. Moreover, the present invention can be utilized for making high clarity, low haze powdered coatings. An example of a preferred type of high clarity polyester resin is set forth herein below wherein the polyester resin is produced utilizing specific amounts of antimony catalysts, low amounts of phosphorus and a bluing agent which can be a cobalt compound.

As noted above, the polyester may be produced in a conventional manner as from the reacting of a dicarboxylic acid having from 2 to 40 carbon atoms with polyhydric alcohols such as glycols or diols containing from 2 to about 20 carbon atoms. The dicarboxylic acids can be an alkyl having from 2 to 20 carbon atoms, or an aryl, or alkyl substituted aryl containing from 8 to 16 carbon atoms. An alkyl diester having from 4 to 20 carbon atoms or an alkyl substituted aryl diester having from 10 to 20 carbon atoms can also be utilized. Desirably, the diols can contain from 2 to 8 carbon atoms and preferably is ethylene glycol. Moreover, glycol ethers having from 4 to 12 carbon atoms may also be used. Generally, most of the commonly produced polyesters are made from either dimethyl terephthalate or terephthalic acid with ethylene glycol. When powdered resin coatings are made, neopentyl glycol is often used in substantial amounts.

Specific areas of use of the polyester include situations wherein preforms exist which then are heated to form a final product, for example, as in the use of preforms which are blow-molded to form a bottle, for example, a beverage bottle, and the like. Another use is in preformed trays, preformed cups, and the like, which are heated and drawn to form the final product. Yet another use relates to polyester yarn which is forced through a plurality of spinnerets having an infrared quench collar thereabout. Additionally, the present invention is applicable to highly transparent, clear and yet low haze powdered coatings wherein a desired transparent film or the like is desired. Because of the improved UV-blocking effect of the inventive compositions, a further use is in injection-molded bottles, such as those intended for juice packaging. Similarly, when used as a bluing agent, the titanium nitride particles of the invention provide packaging having improved color, regardless of whether improved reheat is a necessary effect for the packaging application.

This invention can be further illustrated by the following examples of preferred embodiments, although it will be understood that these examples are included merely for purposes of illustration and are not intended to limit the scope of the invention unless otherwise specifically indicated.

EXAMPLES

Experimental

The following nanometer-size particles used in the examples were purchased from Nanostructured & Amorphous Materials, Inc. (Houston, Tex.):

1. Nanometer-size titanium nitride (TiN) particles. The samples had an average particle size of 20 nm with a relatively narrow particle size distribution. The particles had a stated purity of >97%, a specific surface area of 120 m$^2$/g, a bulk density of 0.08 g/cm$^3$, and a true density of 5.22 g/cm$^3$. The particles had a spherical morphology. Two types of nanometer size TiN particles were obtained, i.e., "JY", type and "KE" type. The two nanometer-scale titanium nitride particles are referred to herein as 20 nm-TiN(JY) and 20 nm-TiN(KE). The average particle size of the two samples was confirmed by transmission electron microscopy. Average particle size values of both samples, as expressed by d$_{50}$, were around 20 nm.

2. Titanium carbonitride (empirical formula approximately TiC$_{0.5}$N$_{0.5}$) nanometer size particles. The particles had a stated average particle size of 50-80 nm. The bulk density was 0.23 g/cm$^3$, and true density was 5.08 g/cm$^3$.

The micron-scale titanium nitride (TiN) particles used in the examples were purchased from Aldrich, and had a reported d$_{50}$ of less than 3 μm. The d$_{50}$ as estimated using a scanning electron microscope was about 1.5 μm.

In the examples, the reheat of a given polyester composition was measured as a twenty-ounce bottle preform Reheat Improvement Temperature (RIT).

In order to determine the RIT of each composition, all preforms were run through the oven bank of a Sidel SBO2/3 blow molding unit in a consistent manner. The lamp settings for the Sidel blow molding machine are shown in Table 1. The reheat time was 38 seconds, and the power output to the quartz infrared heaters was set at 64%. A series of fifteen preforms was passed in front of the quartz infrared heaters and the average preform surface temperature of the middle five preforms was measured. As mentioned earlier, in the examples, the reheat rate of a given composition was measured by preform reheat improvement temperature. The preform reheat improvement temperature was calculated by comparing the difference in preform surface temperature of the target samples with that of the virgin polymer. The higher the RIT value, the higher the reheat rate of the composition.

The concentration of the aforementioned additive particles in the samples was determined by Inductively Coupled Plasma-Optical Emission Spectroscopy (ICP-OES) using a Perkin-Elmer Optima 2000 instrument.

Bottles used for the UV-VIS measurements were blown using the Sidel SBO2/3 blow molding unit as already described. These bottles were blown at a preform surface temperature of 110° C. to ensure consistent material distribution in the sidewall. Bottle sidewall thickness was all around 0.012 inches. Samples for the UV-VIS measurements were cut from a similar location of different bottles for comparison purposes. The UV-VIS transmission rate measurements were performed using HP8453 Ultraviolet-Visible Diode Array Spectrometer. The tests were performed from a wavelength ranging from 200 nm to 800 nm.

Color measurements were performed using a HunterLab UltraScan XE (Hunter Associates Laboratory, Inc., Reston Va.), which employs diffuse/8° (illumination/view angle) sphere optical geometry. The color scale employed was the CIE LAB scale with D65 illuminant and 10° observer specified. Preforms with a mean outer diameter of 0.846 inches and a wall thickness of 0.154 inches were measured in regular transmission mode using ASTM D1746, "Standard Test Method for Transparency of Plastic Sheeting." Preforms were held in place in the instrument using a preform holder, available from HunterLab, and triplicate measurements were averaged, whereby the sample was rotated 90° about its center axis between each measurement.

Bottle sidewall haze was measured using a BYK-Gardner (Silver Spring, Md.) haze-guard plus according to ASTM D 1003-00 on sections of the bottle sidewalls with a sidewall thickness of 0.012 inches.

Color in transmission at any thickness can be recalculated according to the following:

$$T_h = T_o 10^{-\beta h}$$

$$\beta = \frac{\log_{10}(T_o/T_d)}{d}$$

Where
$T_h$ = transmittance at target thickness
$T_o$ = transmittance without absorption
$\beta$ = Absorption coefficient
$T_d$ = transmittance measured for sample
h = target thickness
d = thickness of sample Examples 1-5

The base polymer used in Examples 1-5 was a commercial grade PET Voridian™ CM01 Polymer, which is a PET copolymer containing no titanium nitride or titanium carbonitride. Prior to compounding, the CM01 polymer was dried at 150° C. for 8 hrs. The particles were added into virgin CM01 polymer during melt compounding. First, concentrates (containing on the order of 500 ppm particles) were made using a one-inch single-screw extruder with saxton and pineapple mixing head. The extruder was also equipped with pelletization capability. The concentrate was then crystallized using a tumbling crystallizer at 170° C. for 1 hour. The crystallized concentrate was then let down into CM01 virgin polymer with the final concentration of titanium nitride in CM01 ranging from 2 ppm to 50 ppm. During the compounding process, CM01 virgin polymer was used to purge the extruder barrel several times to ensure no cross contamination between different batches. Finally, the CM01 polymers with different levels of titanium nitride particles were injection molded into twenty-ounce bottle preforms using a BOY (22D) injection molding machine operated under the following injection molding conditions: melt temperature 270° C., mold temperature 3° C., cycle time 30 s, screw speed 110 rpm, and cooling time 12 s.

FIG. 1 and Table 2 show the correlation between the concentration of 20 nm-TiN(JY) and the preform reheat improvement temperature (RIT), from which one can see that 10 ppm 20 nm-TiN(JY) was suitable to achieve an RIT of 10.5° C. The data also suggest that RIT increased roughly by 1° C. to 2° C. for every 1 ppm increase of 20 nm-TiN(JY).

FIG. 1 depicts the correlation between the concentration of 20 nm titanium nitride particles and the twenty-ounce bottle preform reheat improvement temperatures (RIT) of bottles containing the particles.

TABLE 2

Impact of 20 nm-TiN (JY) on twenty-ounce bottle preform reheat improvement temperature (RIT), intrinsic viscosity (ItV), and color.

| Ex. | System | d50 of TiN (nm) | Measured TiN concentration (ppm) | Preform ItV (dL/g) | Preform RIT (° C.) | Preform L* | Preform a* | Preform b* |
|---|---|---|---|---|---|---|---|---|
| 1 | CM01 | NA | 0 | 0.78 | 0 | 83.3 | −0.5 | 2.5 |
| 2 | CM01 + 20 nm-TiN(JY) | 20 | 2 | 0.78 | 3.3 | 80.3 | −0.9 | 1.5 |
| 3 | CM01 + 20 nm-TiN(JY) | 20 | 4 | 0.77 | 5.7 | 79.1 | −1.1 | 0.9 |
| 4 | CM01 + 20 nm-TiN(JY) | 20 | 10 | 0.76 | 10.5 | 71.9 | −1.9 | −0.8 |
| 5 | CM01 + micron-size TiN | 1,500 | 41 | 0.76 | 4.1 | 79.9 | −0.7 | 2.2 |

Figure 2:
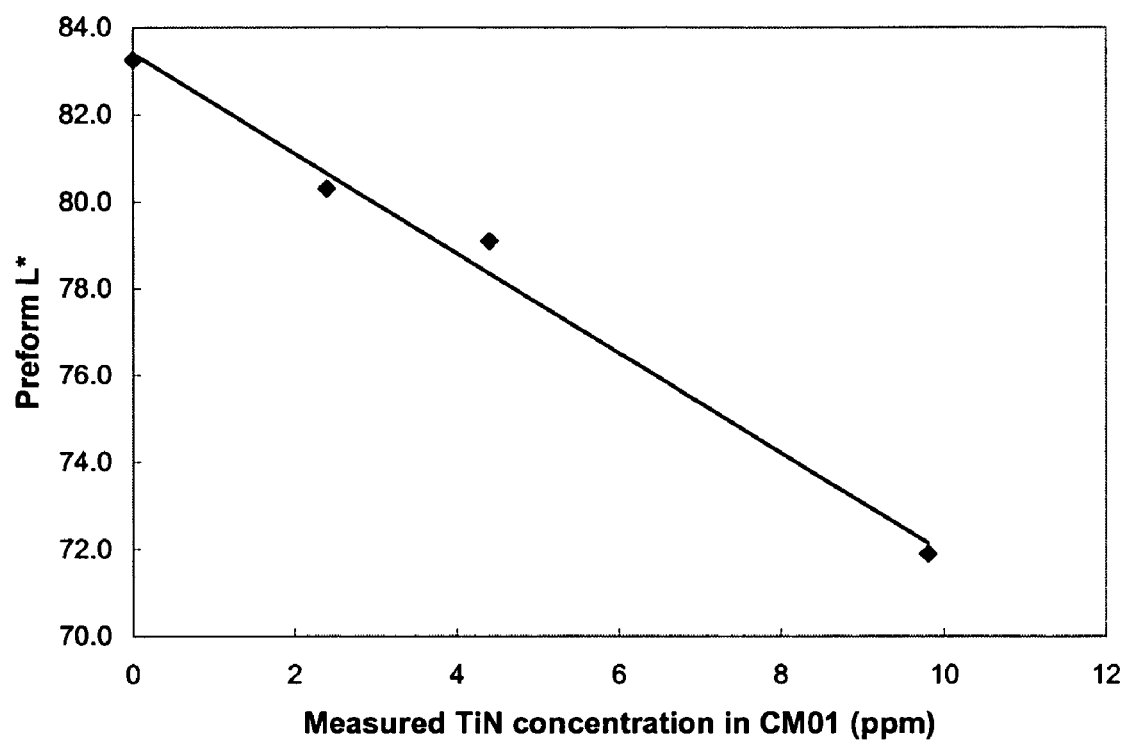
FIG. 2 depicts the correlation between the concentration of 20 nm titanium nitride particles and the twenty-ounce bottle preform L* values of bottles containing the particles.
Figure 3:
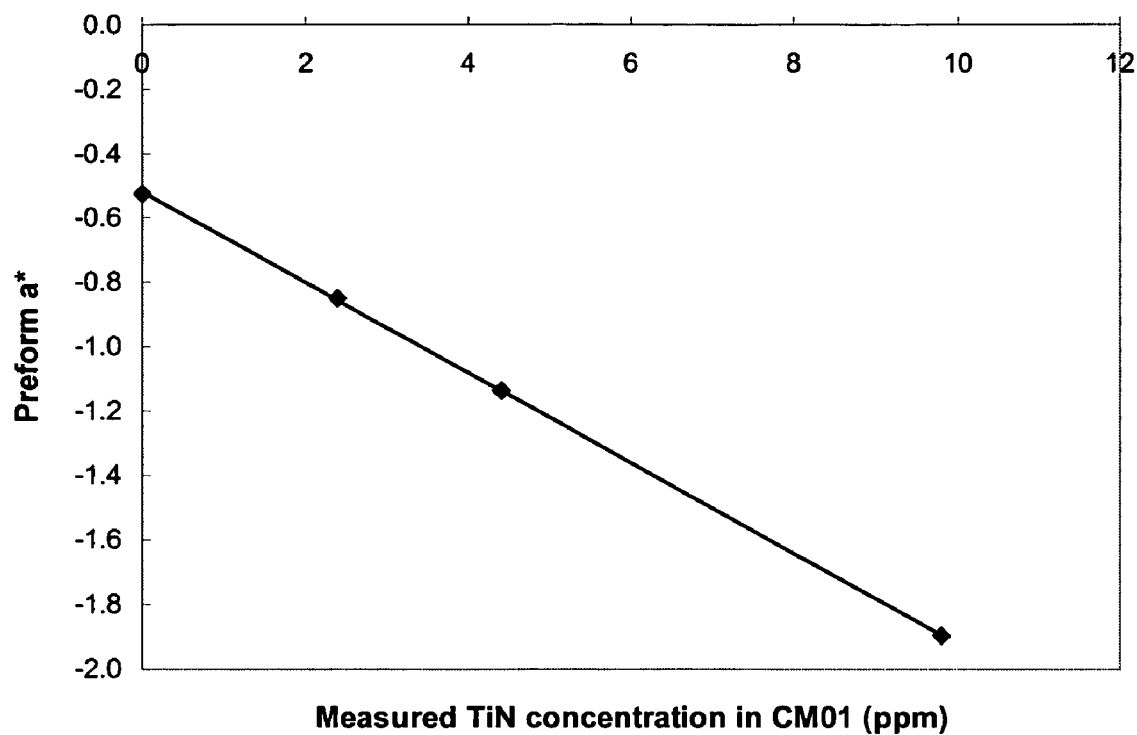
FIG. 3 depicts the correlation between the concentration of 20 nm titanium nitride particles and the twenty-ounce bottle preform a* values of bottles containing the particles.
Figure 4:
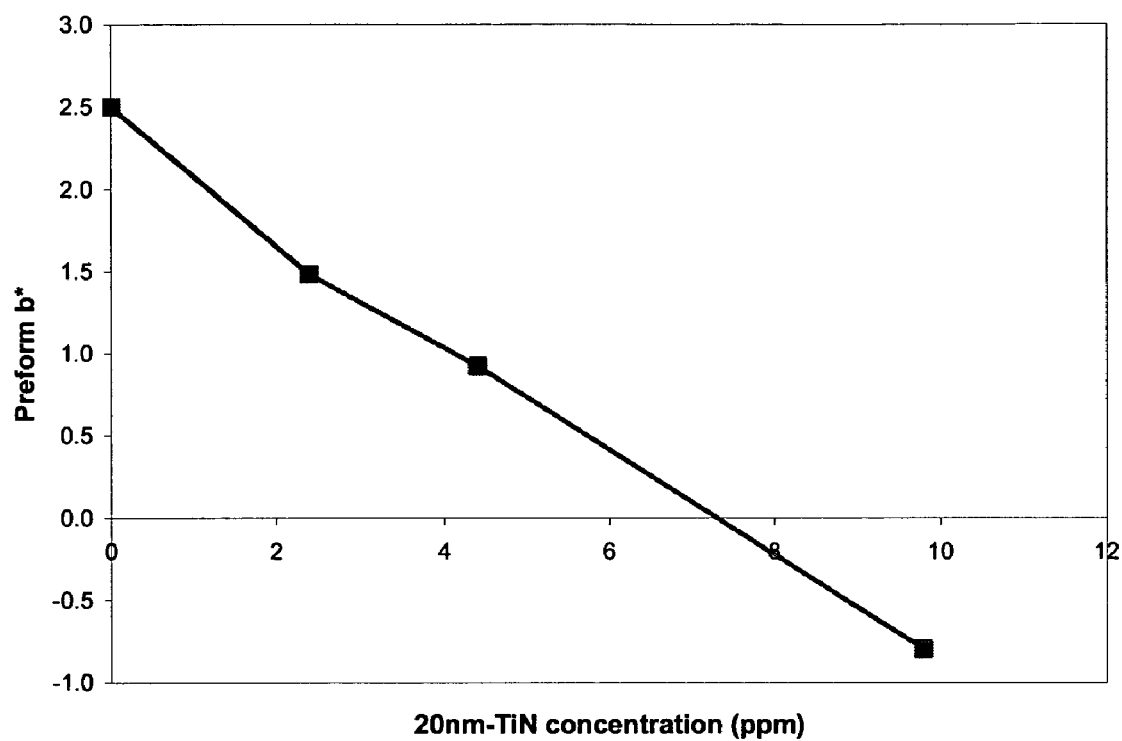
FIG. 4 depicts the correlation between the concentration of 20 nm titanium nitride particles and the twenty-ounce bottle preform b* values of bottles containing the particles.

FIGS. 2-4 also show that 20 nm-TiN(JY) particles led to satisfactory preform color values. Titanium nitride led to a lower (compared to control sample) b* value in the virgin polymer, indicating its blue tinting power (FIG. 4). It is evident that b* decreased significantly with the addition of 20 nm-TiN (JY) particles: the preform b* decreased roughly 0.3 units at every 1 ppm increase of 20 nm-TiN (JY). Therefore, with the addition of 20 nm-TiN (JY) at 10 ppm, the b* value decreased by 132%, indicating a significant negative b* shift, or bluing effect. The visual observation of the difference in b* was also quite striking.

Thus, the titanium nitride particles with nanometer-scale particle size were effective as a reheat additive as well as a bluing agent.

FIG. 2 depicts the correlation between the concentration of 20 nm titanium nitride particles and the twenty-ounce bottle preform L* values of bottles containing the particles.

FIG. 3 depicts the correlation between the concentration of 20 nm titanium nitride particles and the twenty-ounce bottle preform a* values of bottles containing the particles.

FIG. 4 depicts the correlation between the concentration of 20 nm titanium nitride particles and the twenty-ounce bottle preform b* values of bottles containing the particles.

The impact of titanium nitride particles on preform ItV is also shown in Table 2, from which one can see that no significant preform ItV change resulted from the addition of 20 nm-TiN(JY).

Examples 6-10

The base polymer used in Examples 6-10 was also commercial grade PET Voridian™ CM01 Polymer, and the samples were prepared as already described above. In these examples, the nano-scale TiN particles used were 20 nm KE type of TiN, i.e. 20 nm-TiN(KE). Table 3 shows that the bluing effect from the 20 nm-TiN(KE) was even greater than that from the 20 nm-TiN(JY). At 11 ppm loading of 20 nm-TiN(KE), the preform b* drop was 5.9 units. These examples also show that bottle sidewall haze was only minimally impacted with the addition of 20 nm-TiN(KE).

On the other hand, with the addition of micron-scale TiN, such as the 1,500 nm particles seen in Table 2 (ex. 5), the bluing effect was less significant.

Examples 11-19

In this set of examples, two PET copolymers were used, i.e., Voridian Aqua PET WA314 intended for water bottle packaging, and carbonated soft drink grade resin, CB12, both available from Eastman Chemical Company, Kingsport, Tenn. These resins were evaluated as blends with MXD-6 at 3.0 wt % plus various levels of 20 nm-TiN (JY), and then as blends with PET only, WA314, plus various levels of 20 nm-TiN (JY).

Blends were prepared by drying the PET at 150° C. for 8 hrs. MXD-6 grade 6007 was obtained from Mitsubishi and was not dried as it is shipped in foil-lined bags already dried. The pellet/pellet blends were prepared after drying and just before injection molding of the preforms using a cement-type mixer with baffles. Immediately after blends were homogenized in the mixer, they were placed in the hopper of the injection molding machine with a hot air purge. The blends were subsequently molded into twenty ounce preforms, 25 grams. The preform color was measured using the method already described. Preform acetaldehyde (M) concentration was measured according to ASTM F.2013.

The data for each set of blends is set out in Table 4, from which it can be seen that the addition of 3% MXD-6, grade 6007, caused the color of WA314 to drop 8 L* units and the b* to decrease 6.5 units. This b* change was unexpected, as usually the blend shifts to the yellow side; however, we believe the increased haze from the PET/polyamide blend confounded the color measurement to give a misleading b* value. With the addition of titanium nitride, the b* continued to shift to the blue side while the L* dropped at a rate of 1 unit per 1 ppm of 20 nm-TiN (JY). The acetaldehyde (AA) was affected by the polyamide, such that it dropped more than 58% in the blend of PET/MXD-6, as compared to the WA314 control. The addition of titanium nitride appeared to drop the AA slightly more, from 2.36 to 1.89, or about a 66.5% reduction.

TABLE 3

Impact of 20 nm-TiN(KE) on twenty-ounce bottle preform reheat improvement temperature (RIT), intrinsic viscosity (ItV) and color.

| Ex. | d50 of 20 nm-TiN (KE) (nm) | 20 nm-TiN (KE) conc. (ppm) | Preform RIF (° C.) | Preform L* | Preform a* | Preform b* | Preform ItV (dL/g) | Bottle sidewall haze |
|---|---|---|---|---|---|---|---|---|
| 6 | NA | 0 | 0 | 83.3 | −0.5 | 2.5 | 0.77 | 0.85 |
| 7 | 20 | 5 | 10 | 75.5 | −1.2 | −0.4 | 0.76 | 0.91 |
| 8 | 20 | 11 | 19 | 66.0 | −1.5 | −3.4 | 0.77 | 1.12 |
| 9 | 20 | 22 | 24 | 59.5 | −1.7 | −5.4 | 0.76 | 1.23 |
| 10 | 20 | 33 | 31 | 47.4 | −1.8 | −8.5 | 0.76 | 1.71 |

TABLE 4

Impact of concentration level of 20 nm-TiN (JY) on compositions including a polyamide in WA314.

| Ex. | Conc. of MXD-6/ Conc. of 20 nm-TiN (JY) in WA314 | Preform L* | Preform a* | Preform b* | Bottle sidewall haze | Preform AA (ppm) |
|---|---|---|---|---|---|---|
| 11 | 0 - 0 | 85.7 | −0.2 | 1.5 | 0.45 | 5.65 |
| 12 | 3.0% - 0 ppm | 77.7 | −1.0 | −5.0 | 5.69 | 2.36 |
| 13 | 3.0% - 5 ppm | 72.0 | −1.6 | −6.4 | 5.96 | 2.12 |
| 14 | 3.0% - 10 ppm | 66.9 | −2.2 | −8.0 | 6.92 | 1.90 |
| 15 | 3.0% - 20 ppm | 59.2 | −2.8 | −8.6 | 7.24 | 1.89 |

When looking at WA314 blended with TiN only (Table 5), it can be seen that again 20 nm-TiN (JY) dropped the L* about 1 unit per 1 ppm and moved b* about 1.5 units per 5 ppm's TiN, toward the blue side (lower b*). The AA did not change significantly, nor did the haze increase as it usually does with most reheat-enhancing additives.

TABLE 5

WA314 preforms containing 20 nm-TiN (JY).

| Ex. | Conc. of 20 nm-TiN in WA314 (ppm) | Preform L* | Preform a* | Preform b* | Bottle sidewall haze | Preform AA (ppm) |
|---|---|---|---|---|---|---|
| 16 | 0 | 86.0 | −0.3 | 1.6 | 0.47 | 4.47 |
| 17 | 5 | 79.8 | −1.0 | −0.1 | 0.57 | 4.32 |
| 18 | 10 | 75.1 | −1.6 | −1.5 | 0.78 | 4.61 |
| 19 | 20 | 68.2 | −2.5 | −3.2 | 0.99 | 4.42 |

Examples 20-24

When looking at the blends of CB12 with MXD-6 and 20 nm-TiN (JY) in Table 6, prepared as above, it can be seen that preform L* dropped about 5 units when the MXD-6 was added while the haze was increased by about 6 units. The further addition of 20 nm-TiN (JY) did not change the haze value significantly. However, there was a slight trend in AA reduction with increasing 20 nm-TiN. L* was again lowered about 1 unit per 1 ppm of 20 nm-TiN(JY). The b* decreased about 0.257 units, on average, per 1 ppm TiN.

TABLE 6

Impact of concentration level of 20 nm-TiN (JY) on preform color, bottle sidewall haze and preform AA for a blend of CB12 with 3 wt % MXD-6.

| Ex. | Conc. of MXD-6/ 20 nm-TiN (JY) in CB12 | Preform L* | Preform a* | Preform b* | Bottle sidewall haze | Preform AA (ppm) |
|---|---|---|---|---|---|---|
| 20 | 0 | 71.0 | −1.4 | 4.5 | 1.62 | 9.39 |
| 21 | 3.0% - 0 ppm | 65.6 | −3.0 | 2.7 | 7.71 | 3.96 |
| 22 | 3.0% - 5 ppm | 63.6 | −2.9 | 2.3 | 6.13 | 4.46 |

TABLE 6-continued

Impact of concentration level of 20 nm-TiN (JY) on preform color, bottle sidewall haze and preform AA for a blend of CB12 with 3 wt % MXD-6.

| Ex. | Conc. of MXD-6/ 20 nm-TiN (JY) in CB12 | Preform L* | Preform a* | Preform b* | Bottle sidewall haze | Preform AA (ppm) |
|---|---|---|---|---|---|---|
| 23 | 3.0% - 10 ppm | 55.3 | −4.0 | −0.2 | 7.45 | 3.71 |
| 24 | 3.0% - 20 ppm | 48.6 | −4.4 | −2.1 | 7.83 | 3.51 |

Examples 25-26

The base polymer used in examples 25-26 was commercial grade PET Voridian™ CM01 Polymer. The samples were prepared as already described. UV light radiation experiment: 20 ounce bottles made with virgin CM01, and a sample with 77 ppm 20 nm-TiN (JY) in CM01, were blown at the same preform surface temperature and were tested under UV light. The UV light lamp used was a model UVL-28, obtained from UVP, Inc. (UPLAND, Calif.). It held two 8 watt bulbs that emit light from 340 to 400 nm with a peak emission at 365 nm. The lamp had a filter that filtered light with wavelengths above 400 nm. The beverage used was a juice drink containing FD&C Red#40. Testing was done to see if the addition of TiN to CM01 would increase the UV protection provided by the polymer. All samples were tested in a consistent manner.

Table 7 shows the 370 nm-UV transmission rate of each of the samples, from which one can see at 79.4 ppm loading of TiN, the UV transmission rate at 370 nm decreased 22%. The sample thickness was approximately 0.012 inches.

TABLE 7

Comparison of the 370 nm UV light transmission rates.

| Ex. | System | TiN concentration (ppm) | 370 nm transmission rate (%) |
|---|---|---|---|
| 25 | CM01 control | 0 | 78.7 |
| 26 | CM01 + 20 nm-TiN (JY) | 79.4 | 61.4 |

Figure 5:
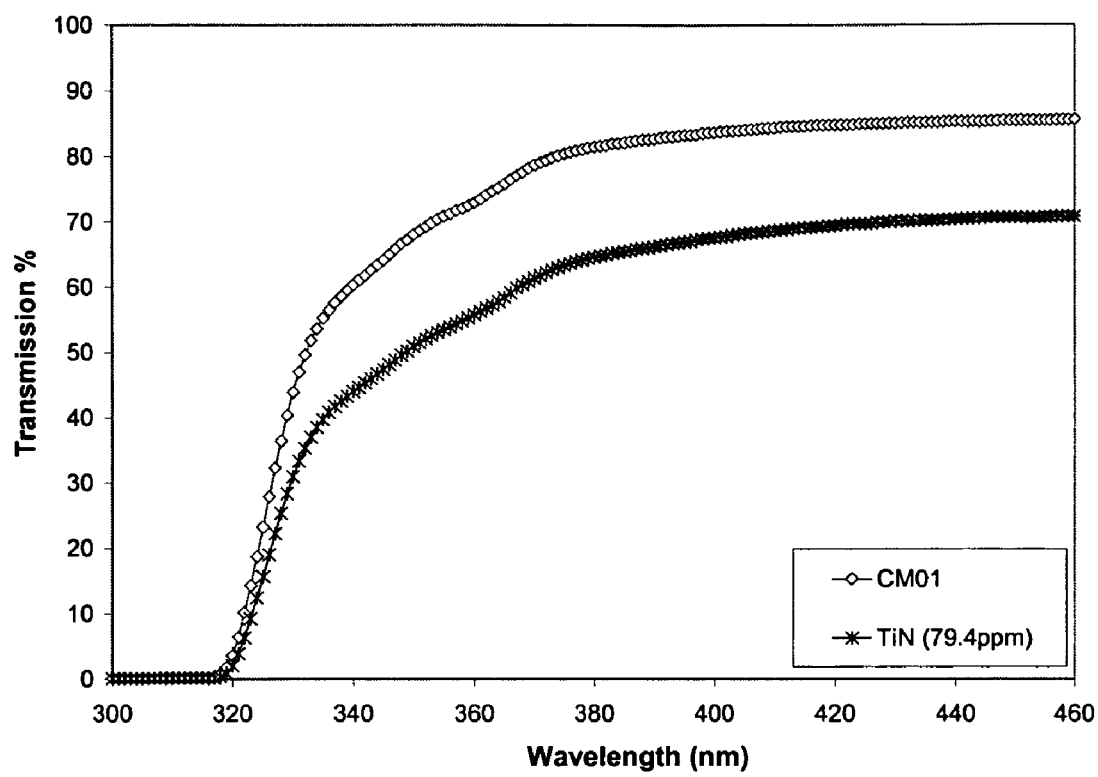
FIG. 5 depicts the UV-VIS transmission spectra of a base polymer sample and polymer samples containing 20 nm titanium nitride particles.

FIG. 5 shows the results for the transmission spectrum from 300 nm to 460 nm. From this figure, it can be seen that almost all the light with a wavelength lower than 300 nm was removed by the PET virgin polymer. The addition of 20 nm-TiN (JY) to the base polymer resulted in a decrease in the transmission rate from 320 nm to 400 nm.

Examples 27-32

Table 8 shows that the addition of $TiC_{0.5}N_{0.5}$ also led to an improvement in reheat rates. The base polymer used in examples 27-32 was commercial grade PET Voridian™ CM01 Polymer. The addition of 6.4 ppm $TiC_{0.5}N_{0.5}$ led to an RIT of 7° C. with an L* value of 76.2. Good preform appearance properties were also achieved at reasonable reheat improvement temperatures, e.g. RIT=7° C.

TABLE 8

Impact of titanium carbonitride (TiC$_{0.5}$N$_{0.5}$) on twenty-ounce bottle preform reheat improvement temperature (RIT), intrinsic viscosity (ItV) and color.

| Ex. | Concentration of TiC$_{0.5}$N$_{0.5}$ in CM01 (ppm) | Syetem | Preform RIT (° C.) | Preform L* | Preform a* | Preform b* | Preform ItV (dL/g) | Bottle sidewall haze |
|---|---|---|---|---|---|---|---|---|
| 27 | 0 | CM01 control | 0 | 83.3 | −0.5 | 2.5 | 0.77 | 0.85 |
| 28 | 6.4 | CM01 + TiC$_{0.5}$N$_{0.5}$ (50-80 nm) | 7 | 76.2 | −0.3 | 4.6 | 0.77 | 1.04 |
| 29 | 9.9 | CM01 + TiC$_{0.5}$N$_{0.5}$ (50-80 nm) | 14 | 70.4 | 0.0 | 5.8 | 0.76 | 1.11 |
| 30 | 24.1 | CM01 + TiC$_{0.5}$N$_{0.5}$ (50-80 nm) | 23 | 56.1 | 0.7 | 8.3 | 0.76 | 1.32 |
| 31 | 29.2 | CM01 + TiC$_{0.5}$N$_{0.5}$ (50-80 nm) | 29 | 45.6 | 1.3 | 9.8 | 0.76 | 1.53 |
| 32 | 41.9 | CM01 + TiC$_{0.5}$N$_{0.5}$ (50-80 nm) | 32 | 38.0 | 1.6 | 10.2 | 0.76 | 1.90 |

We claim:

1. A polyester composition comprising:
   a polyester polymer; and
   titanium nitride particles having a median particle size from about 1 nm to about 1,000 nm, dispersed in the polyester polymer, in an amount of from 5 ppm to 50 ppm, with respect to the total weight of the polyester composition.

2. A polyester composition, comprising:
   a polyester polymer in which poly(ethylene terephthalate) residues comprise at least 90 wt. % of the polyester polymer; and
   titanium nitride particles, having a median particle size from about 1 nm to about 1,000 nm, randomly dispersed in the polyester polymer in an amount from about 1 to about 50 ppm, wherein the polyester composition is in the form of a beverage bottle preform having a reheat improvement temperature of 5° C. or more, and a b* value that is at least 1 unit less than it would be in the absence of the titanium nitride particles.

3. A polyester composition, comprising:
   a polyester polymer; and
   titanium nitride particles dispersed in the polyester polymer in an amount from 1 ppm to 50 ppm with respect to the total weight of the polyester composition.

4. A polyester composition according to claim 3, wherein the titanium nitride particles are present in the polyester polymer in an amount from 5 ppm to 50 ppm with respect to the total weight of the polyester composition.

5. A polyester composition according to claim 3, wherein the titanium nitride particles are present in the polyester polymer in an amount from 1 ppm to 10 ppm with respect to the total weight of the polyester composition.

6. A polyester composition according to claim 3, wherein the titanium nitride particles are present in the polyester polymer in an amount from 2 ppm to 10 ppm with respect to the total weight of the polyester composition.

7. A polyester composition according to claim 3, wherein the titanium nitride particles are present in the polyester polymer in an amount from 4 ppm to 10 ppm with respect to the total weight of the polyester composition.

8. A polyester composition according to claim 3, wherein the titanium nitride particles are present in the polyester polymer in an amount from 5 ppm to 10 ppm with respect to the total weight of the polyester composition.

9. A polyester composition according to claim 3, wherein the titanium nitride particles have a median particle size less than 1 um.

10. A polyester composition according to claim 3, wherein the titanium nitride particles have a median particle size from 0.005 μm to 100 μm.

11. A polyester composition according to claim 3, wherein the titanium nitride particles have a median particle size from 0.01 μm to 45 μm.

12. A polyester composition according to claim 3, wherein the titanium nitride particles have a median particle size from 0.01 μm to 10 μm.

13. A polyester composition according to claim 3, wherein the titanium nitride particles have a median particle size from 0.01 μm to 5 μm.

14. A polyester composition according to claim 3, wherein the titanium nitride particles have a median particle size from 10 nm to 20 nm.

15. A polyester composition according to claim 3, wherein the titanium nitride particles have a median particle size from 5 nm to 20 nm.

16. A polyester composition according to claim 1, wherein the titanium nitride particles have a median particle size from 10 nm to 20 nm.

17. A polyester composition according to claim 1, wherein the titanium nitride particles have a median particle size from 5 nm to 20 nm.

18. A polyester composition comprising:
   a polyester polymer; and
   titanium nitride particles having a median particle size from 10 nm to 20 nm, dispersed in the polyester polymer, in an amount of from 1 ppm to 10 ppm, with respect to the total weight of the polyester composition.

19. A polyester composition according to claim 18, wherein the titanium nitride particles are present in the polyester polymer in an amount from 2 ppm to 10 ppm with respect to the total weight of the polyester composition.

20. A polyester composition according to claim 18, wherein the titanium nitride particles are present in the polyester polymer in an amount from 4 ppm to 10 ppm with respect to the total weight of the polyester composition.

21. A polyester composition according to claim 18, wherein the titanium nitride particles are present in the polyester polymer in an amount from 5 ppm to 10 ppm with respect to the total weight of the polyester composition.

* * * * *